US006635232B1

(12) United States Patent
Yaita et al.

(10) Patent No.: US 6,635,232 B1
(45) Date of Patent: Oct. 21, 2003

(54) METHOD OF CHEMICALLY DECONTAMINATING COMPONENTS OF RADIOACTIVE MATERIAL HANDLING FACILITY AND SYSTEM FOR CARRYING OUT THE SAME

(75) Inventors: Yumi Yaita, Tokyo-To (JP); Masami Enda, Yokohama (JP); Hitoshi Sakai, Yokohama (JP)

(73) Assignee: Kabushiki Kaisha Toshiba, Kanagawa-ken (JP)

( * ) Notice: Subject to any disclaimer, the term of this patent is extended or adjusted under 35 U.S.C. 154(b) by 0 days.

(21) Appl. No.: 09/468,906

(22) Filed: Dec. 22, 1999

(30) Foreign Application Priority Data

May 13, 1999 (JP) .......................................... 11-132892

(51) Int. Cl.$^7$ .......................... G21C 19/00; C23G 1/00; B01F 1/00; C25C 1/00; C01B 13/00

(52) U.S. Cl. ........................ 423/658.5; 376/310; 134/3; 205/626; 204/158.2; 204/158.21

(58) Field of Search ........................... 423/658.5, 150.1; 976/DIG. 376; 510/110; 376/306, 310, 305; 134/3; 205/626, 782, 785.5, 786; 204/157.15, 158.2, 158.21, 157.5

(56) References Cited

U.S. PATENT DOCUMENTS

| | | | | |
|---|---|---|---|---|
| 4,287,002 A | | 9/1981 | Torok | 134/3 |
| 4,704,235 A | * | 11/1987 | Arvesen | |
| 4,756,768 A | | 7/1988 | Bertholdt et al. | 134/3 |
| 4,942,594 A | | 7/1990 | Bertholdt et al. | 376/310 |
| 5,073,333 A | * | 12/1991 | Arvesen | 376/310 |
| 5,203,972 A | * | 4/1993 | Shimamune et al. | |
| 5,262,019 A | * | 11/1993 | Snyder et al. | 423/49 |
| 6,147,274 A | * | 11/2000 | Wood et al. | 588/1 |

FOREIGN PATENT DOCUMENTS

| | | | |
|---|---|---|---|
| EP | 278256 | * | 8/1988 |
| JP | 55-135800 | | 10/1980 |
| JP | 61-097114 | * | 5/1986 |
| JP | 61-110100 | | 5/1986 |
| JP | 3-10919 | | 2/1991 |
| JP | 9-113690 | * | 5/1997 |

* cited by examiner

*Primary Examiner*—Steven Bos
(74) *Attorney, Agent, or Firm*—Foley & Lardner

(57) ABSTRACT

Ozone gas having a high ozone concentration is generated by a solid electrolyte electrolytic process. An ozone solution is prepared by injecting the ozone gas into an acidic solution of pH 6 or below. The ozone solution heated at a temperature in the range of 50° to 90° C. is supplied to a contaminated object to oxidize and dissolve a chromium oxide film by an oxidizing dissolving process. The ozone solution used in the oxidizing dissolving process is irradiated with ultraviolet rays to decompose ozone contained in the ozone solution, the ozone solution is passed through an ion-exchange resin to remove ions contained in the ozone solution. An oxalic acid solution is supplied to the contaminated object to dissolve an iron oxide film by a reductive dissolving process. Oxalic acid remaining in the oxalic acid solution after the reduction dissolving process is decomposed by injecting ozone into the oxalic acid solution and irradiating the oxalic acid solution with ultraviolet rays, and ions contained in the oxalic acid solution is removed by an ion-exchange resin.

18 Claims, 14 Drawing Sheets

METHOD OF CHEMICALLY DECONTAMINATING COMPONENTS OF RADIOACTIVE MATERIAL HANDLING FACILITY AND SYSTEM FOR CARRYING OUT THE SAME

BACKGROUND OF THE INVENTION

1. Field of the Invention

The present invention relates to a method of chemical decontamination for the components of a radioactive material handling facility, such as a nuclear power station, and a system for carrying out the method of removing metal oxides containing radioactive nuclides and adhering to the components of the radioactive material handling facilities from the surfaces of the contaminated components by chemical dissolution.

2. Description of the Related Art

Oxide films containing radioactive nuclides are deposited or formed on the surfaces of components of a nuclear power station in contact with fluids containing radioactive nuclides during operation and subject to radioactive contamination, such as pipes, pieces of equipment and structural members. Consequently, the dose rate around those component members increases and the radiation exposure of workers engaged in work for periodic inspection or dismantlement of a nuclear reactor for decommissioning.

In order to remove the oxide film, a decontaminating solution is supplied the oxide film or a metal forming a contaminated object so as to dissolve them, thereby the oxide film is dissolved in the solution or peeled off into the solution. Aforementioned chemical decontamination method, which dissolves or removes the oxide film chemically, has practically been applied to the decontamination of the components of some nuclear plants and has produced satisfactory results in reducing mediation exposure.

Various chemical decontamination methods intended for the decontamination of stainless steel components of atomic energy plants have been proposed. One of those chemical decontamination methods comprises, in combination, a step of dissolving chromium oxides contained in an oxide film through oxidation using an oxidizing agent, and a step of dissolving ferrous oxides, which are principal components of the oxide film, through reduction a reducing agent.

A chemical decontamination method disclosed in JP B No. Hei 3-10919 employs permanganic acid as an oxidizing agent, and dicarboxylic acid as a reducing agent. The chemical decontaminating method using permanganic acid which has a high oxidizing effect in a low concentration and dicarboxylic acid which can be decomposed into $CO_2$ and $H_2O$ produces less secondary wastes as compared with hitherto known chemical decontamination methods and has practically been applied to decontamination work in nuclear power plants.

A decontamination method disclosed in JP A No. Sho 55-135800 uses, in combination, an ozone solution prepared by dissolving ozone in water as an oxidizing agent, and a decontaminating liquid containing an organic acid and a complexing agent. A decontamination method disclosed in JP A No. Hei 9-151798 prepares a foamed decontaminating liquid by blowing ozone gas into a solution containing a foaming agent, and feeds the foamed decontaminating liquid into a contaminated object for decontamination.

When decontaminating contaminated objects by the chemical decontamination method using permanganic acid and dicarboxylic acid as decontaminating agents, the decontaminating agents produce secondary wastes in recovering manganese ion from the permanganic acid solution by means of an ion-exchange resin.

As generally known, ozone is a highly oxidative gas, reacts with water and is decomposed to produce various oxidative active oxygen species. The decontamination method will be a very effective method producing the least amount of secondary wastes attributable to an oxidizing agent if the oxide film can be dissolved in an ozone solution prepared by efficiently dissolving ozone gas in water. However, the ozone concentration of ozone gas produced by a conventional silent discharge ozonizer is low (in general, lower than 1% by volume), and the ozone concentration of ozone solution prepared by supplying the ozone gas in an acid solution is several parts per million or less.

An oxidation process using an ozone solution having such a low ozone concentration, as compared with a conventional chemical decontamination method using permanganic acid, has an inferior oxide film removing ability. To make matters worse, ozone decomposes in water and the ozone concentration of the ozone solution decreases. When the temperature of the ozone solution is high, the half life of dissolved ozone is short and it is possible that ozone disappears in a few minutes. The higher the temperature of the decontaminating liquid for the chemical decontamination method, the higher is the rate of dissolution of the oxide film and the higher is the decontaminating effect. Therefore, the chemical decontamination method must be carried out at temperatures as high as possible to reduce overall time necessary for decontamination work.

Although it is possible to hold ozone gas in foams produced in the decontaminating liquid by a foaming agent thereby holding ozone in the decontaminating liquid for a long time, the foaming agent produces secondary wastes.

The known chemical decontamination method using oxidation and reduction is applied mainly to decontaminating stainless steel components and cannot be applied to decontaminating components made of metallic materials susceptible to the corrosion by chemicals, such as carbon steels.

SUMMARY OF THE INVENTION

The present invention has been made to solve the foregoing problems and it is therefore an object of the present invention to provide a chemical decontamination method and a system for carrying out the same capable of chemically decontaminating components of radioactive material handling facilities and of efficiently dissolving oxide films through oxidation, and producing only a small amount of secondary wastes.

Another object of the present invention is to provide a chemical decontamination method and a system for carrying out the same capable of decomposing organic acid used as a decontaminating agent, such as oxalic acid, and exhaust ozone gas.

To achieve the objects, according to a first aspect of the present invention, a method of removing an oxide film containing radioactive nuclides and adhering to a component of a radioactive material handling facility is provided. The method includes an oxidative dissolving process for dissolving the oxide film through oxidation using an ozone solution prepared by bringing ozone gas into contact with an acid solution.

Preferably, the ozone solution has a pH value of 6 or below, more preferably, 5 or below.

Oxide films deposited or formed on the surfaces of contaminated components, such as pipes and pieces of equipment of a radioactive material handling facility, can effectively dissolve and removed by using a solution prepared by dissolving ozone, i.e. an oxidative gas, in water of a desired quality.

Preferably, the working temperature of the ozone solution for the oxidative dissolving process is in the range of 50 to 90° C.

Preferably, the ozone gas is produced by an electrolytic ozonizer that has an anode chamber formed on one side of a solid electrolyte and a cathode chamber formed on the other side of the solid electrolyte, and generates ozone in the anode chamber by a solid electrolyte electrolytic process in which pure water is subjected to electrolysis using an anode of a catalytic metal disposed in the anode chamber.

The method may further include a monitoring process for measuring the oxidation-reduction potential of the ozone solution to monitor the oxidative dissolving ability of the zone solution.

The method may further include a reductive dissolving process in which a decontaminating solution, such as an organic acid solution, is supplied to the contaminated object for the reductive dissolution of the oxide film. The amount of secondary wastes originating in decontaminating agents can be reduced by using ozone in the oxidative dissolving process and using an reductive organic acid capable of being decomposed into $CO_2$ and $H_2O$ in the reductive dissolving process.

The method may further include a reducing agent decomposing process for decomposing an organic acid remaining in the organic acid solution after the reductive dissolving process, and an ion removing process for removing ions remaining in the ozone solution or in the organic acid solution.

The reducing agent decomposing process may include the steps of adding at least either ozone or hydrogen peroxide to the organic acid solution, and irradiating the organic acid solution with at least either ultraviolet rays or radioactive rays. The organic acid may be decomposed by using the photocatalytic action of titanium oxide in the reducing agent decomposing process by irradiating titanium oxide with light and bringing titanium oxide into contact with the organic acid solution instead of using those steps.

The method may further include an oxidizing agent decomposing process for decomposing ozone contained in the ozone solution by irradiating the ozone solution with ultraviolet rays or radiation after the oxidative dissolving process.

The organic acid solution used in the reductive dissolving process may contain a salt of the organic acid contained in the organic acid solution in addition to the organic acid. For example, the use of a solution containing oxalic acid and an oxalate enables the application of chemical decontamination to the decontamination of carbon steel members susceptible to corrosion.

According the second aspect of the present invention, a decontamination system, for removing an oxide film containing radioactive nuclides and adhering to a contaminated object, i.e., a component of a radioactive material handling facility, is provided. The system includes: a decontaminating liquid circulating system provided with a pump for circulating a decontaminating liquid through the contaminated object, an ozone supply system for supplying ozone to the decontaminating liquid circulating in the decontaminating liquid circulating system, a pH adjusting agent supply device for supplying a pH adjusting agent to the decontaminating liquid circulating in the decontaminating liquid circulating systems, an organic acid supplying device for supplying an organic acid as a reducing agent to the decontaminating liquid circulating in the decontaminating liquid circulating system, an irradiating device for irradiating the decontaminating liquid circulating in the decontaminating liquid circulating system with light, and an ion-exchange device for removing ions contained in the decontaminating liquid circulating in the decontaminating liquid circulating system.

According the third aspect of the present invention, a method of removing an oxide film containing radioactive nuclides and adhering to contaminated objects, the contaminated objects including a reactor coolant pump for circulating a coolant for cooling a nuclear reactor, and a pipe having sections connected to an inlet side and an outlet side of the coolant circulating pump, respectively, and rising to a level higher than that of the reactor coolant pump, is provided. The method includes the steps of: providing a decontamination system including a first and a second tube, means for producing a decontaminating liquid having a ozonizer and an organic acid supply device, and a decontaminating liquid circulating pump connected to the first and the second tube; inserting the first and second tube into the pipe; and supplying the decontaminating liquid into the pipe through the first tube and discharging the decontaminating liquid through the second pipe so as to circulate the decontaminating liquid through an interior of the pipe and of the coolant circulating pump, while a level of the decontaminating liquid in the pipe is maintained so that the interior of the coolant circulating pump is filled up with the decontaminating liquid.

BRIEF DESCRIPTION OF THE DRAWINGS

The above and other objects, features and advantages of the present invention will become more apparent from the following description taken in connection with the accompanying drawings, in which.

DESCRIPTION OF THE PREFERRED EMBODIMENTS

Preferred embodiments of the present invention will be described hereinafter with reference to the accompanying drawings.

Figure 1:
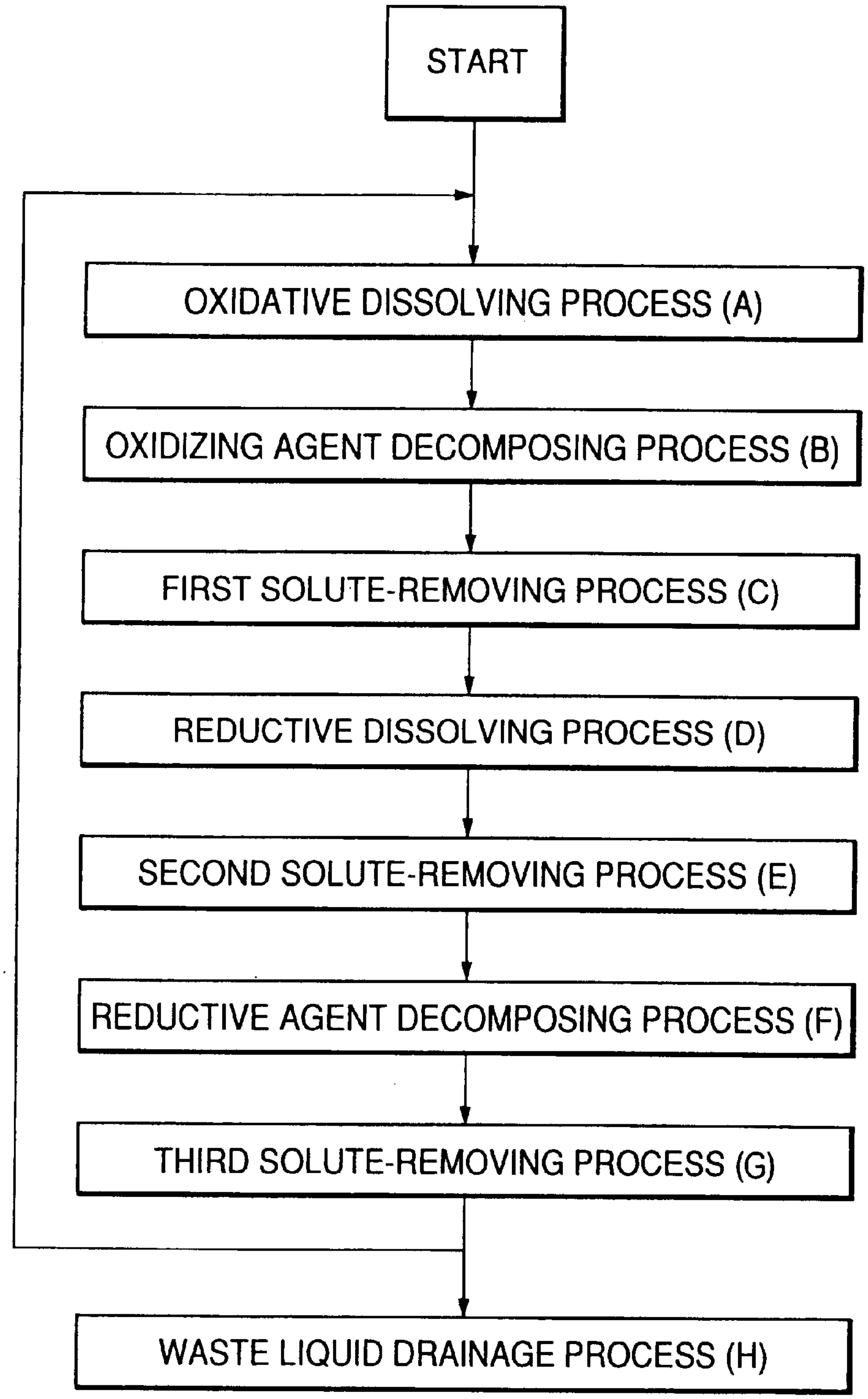
FIG. 1 is a flow chart of a chemical decontamination method according to the present invention.

FIG. 1 is a flow chart of a chemical decontamination method in accordance with the present invention. This chemical decontamination method includes:

(A) an oxidative dissolving process for dissolving and removing oxide films by supplying an ozone solution, i.e., a decontaminating solution, to a contaminated object, (B) an oxidizing agent decomposing process for decomposing ozone contained in the ozone solution, (C) a first solute removing process for removing solutes, such as metal ions, from the decontaminating solution processed by the oxidizing agent decomposing process, (D) a reductive dissolving process for reducing and dissolving oxide films by supplying an organic acid solution, such as an oxalic acid solution, as a decontaminating solution to the contaminated object;

(E) a second solute removing process for removing solutes, such as metal ions, from the decontaminating solution;

(F) a reducing agent decomposing for decomposing the organic acid contained in the organic acid solution;

(G) a third solute removing process for removing solutes, such as metal ions, from the decontaminating solution processed by the organic acid decomposing process; and (H) a drainage process for draining the cleaned decontaminating solution.

Those processes will individually be described hereinafter.

(A) Oxidative Dissolving Process

An acidic solution is prepared, preferably by addition of an acid to pure water. Preferably, the acid is an inorganic acid, such as nitric acid. Preferably, the acidic solution has a pH value of 6 or below, more preferably, 5 or below. Ozone gas is dissolved in the acidic solution to produce an acidic ozone solution, namely, a decontaminating liquid. The acidic solution having the aforesaid pH value has a large ozone dissolving capacity.

Ozone is an oxidative gas. Ozone gas dissolved in water or the acidic solution is decomposed by reactions represented by the following formulas and active oxygen species are produced.

$$O_3+OH^- \rightarrow HO_2+O_2^- \quad (1)$$

$$O_3+HO_2 \rightarrow 2O_2+OH \quad (2)$$

$$O_3+OH \rightarrow O_2+HO_2 \quad (3)$$

$$2HO_2 \rightarrow O_3+H_2O \quad (4)$$

$$HO_2+OH \rightarrow H_2O \quad (5)$$

As obvious from oxidation-reduction potentials shown in Table 1, ozone and those active oxygen species are strong oxidizer as compared with permanganic ions.

TABLE 1

| Electrode reaction | Potential (V) vs. NHE |
|---|---|
| $OH + H^+ + e^- = H_2O$ | 2.81 |
| $O_3 + 2\ H^+ + 2\ e^- = O_2 + H_2O$ | 2.07 |
| $HO_2 + 3\ H^+ + 3\ e^- = 2\ H_2O$ | 1.7 |
| $MnO_4^- + 4\ H^+ + 3\ e^- = MmO_2\ 2\ H_2O$ | 1.7 |

The ozone solution thus prepared is supplied to a contaminated object. Then, chromium oxides contained in oxide films can be dissolved in the ozone solution by the oxidizing power of ozone and active oxygen species. If the ozone solution is acidic or neutral and have an oxidation-reduction potential on the order of 1110 mV, chromium is in a stable form of $HCrO_4^-$, $CrO_4^{2-}$ or $Cr_3O_7^{2-}$ produced by the condensation of those ions. Therefore it is inferred that $Cr_2O_3$ undergoes the following reactions and dissolves in the ozone solution.

$$Cr_2O_3+3O_3+2H_2O \rightarrow 2CrO_4^{2-}+4H^++3O_2$$

$$Cr_2O_3+3O_3+H_2O \rightarrow Cr_2O_7^{2-}+2H^-+3O_2$$

It is difficult to dissolve chromium oxides contained in metal oxide films deposited or formed on the surfaces of pipes and components of a radioactive material handling facility, such as a nuclear power plant, by a reductive dissolving process. Those chromium oxides can be dissolved by an oxidative dissolving process. Ozone is strong oxidizer as mentioned above, and it is a suitable decontaminating agent for an oxidative dissolving process.

Ozone contained in the ozone solution is consumed by reaction and self-decomposes, and the amount of ozone contained in the ozone solution decreases. Since the oxide film dissolving ability of the ozone solution depends on the ozone concentration of the ozone solution, it is preferable to monitor the ozone concentration of the ozone solution continuously during the oxidative dissolving process and to control ozone supply rate. Preferably, the ozone concentration is monitored through the measurement of the oxidation-reduction potential of the ozone solution.

Figure 2:
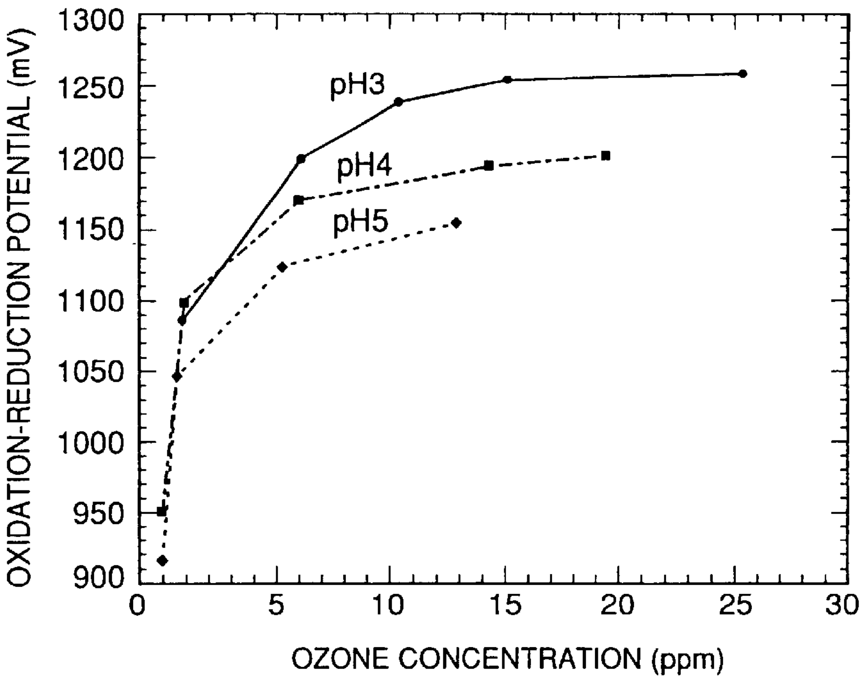
FIG. 2 a is graph showing the dependence of oxidation-reduction potential on the ozone concentration of an ozone solution.

FIG. 2 shows the relation between measured values of oxidation-reduction potential and measured values of the ozone concentration of the ozone solution. Since there is a positive correlation between the oxidation-reduction potential and the ozone concentration as shown in FIG. 2, the ozone concentration of the ozone solution can easily be monitored through the monitoring of the oxidation-reduction potential.

[(A-1) pH Value of Ozone Solution]

Results of experiments examined the effect of the pH value of the ozone solution on oxide film dissolving ability will be explained. An acid or an alkali is dissolved in 500 $cm^3$ of 50° C. pure water to prepare the solutions having different pH values in the range of 3 to 9. A 4% by volume ozone gas was supplied to each of the solutions at a supply rate of 50 $cm^3$/min. This condition for supplying the ozone gas to the solution will be referred to as "ozone supply condition 1". The respective ozone concentrations of the solution were measured.

A test piece of 2 cm×3 cm×0.1 cm was prepared by cutting a sheet of SUS304 (JIS), i.e., an austenitic stainless steel containing about 18% Cr and about 8% Ni and prevalently used for forming structural members of nuclear reactors. The test piece was immersed in hot water simulating fluid conditions for the reactor coolant system of a boiling-water reactor (BWR) for 3000 hr to form an oxide film on the surface of the test piece. This condition will be referred to "oxidizing condition 1".

The test piece was immersed in the ozone solution for 2 hr while ozone was supplied under the ozone supply condition 1. A comparative test piece as a comparative example was prepared by the same procedures and the comparative test piece was immersed in a 0.03% permanganic acid solution heated at 95° C., which is used by the conventional method, for 2 hr.

When the test piece is immersed in the oxidative solution, the weight of the components of the oxide film, subject to oxidative dissolution decreases by a weight decrement, whereas oxides which can further be oxidized are bonded with oxygen and the weight of those oxides increases by a weight increment. The weight of the test piece after the oxidation process is equal to the result of addition of the weight increment to and subtraction of the weight decrement from the initial weight and hence the exact effect of oxidative dissolution can not be known. After the immersion of the test piece in the ozone solution and the comparative test piece in the permanganic acid solution, the test piece and the comparative test piece were immersed in 0.2% oxalic acid solution of 95° C. for 1 hr. This immersing condition will be referred to as "reducing condition 1". Thus, all the dissolvable oxides were removed by immersing the test piece and the comparative test piece in the oxidizing solutions and the reductive solution, and then weight loss of the test piece and the comparative test piece were measured.

Figure 3:
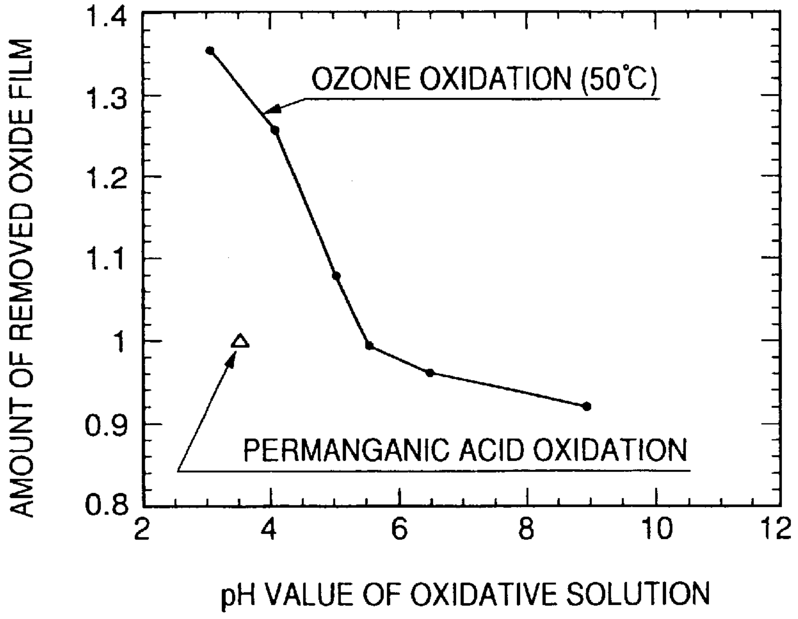
FIG. 3 is a graph showing the dependence of oxidation-reduction potential on the pH value of an oxidative processing solution.

FIG. 3 shows the dependence of the removed amount of the oxide film in the ozone solution on the pH value of the ozone solution. The removed amount of the oxide film in the ozone solution starts increases as the pH value decreases beyond 6 and increases sharply as the pH value decreases further beyond 5. As obvious from FIG. 3, the oxide film dissolving ability of ozone solutions having pH values less than 5 was equal to or higher than that of the permanganic acid solution, which is because the higher the ozone concentration of the ozone solution, the higher the oxide film dissolving ability of the ozone solution when the temperature of the ozone solution is constant, and the smaller the pH value, the dissolution of ozone is accelerated. The oxidation-reduction potentials of ozone solution having pH values not greater than 5 was higher than the measured oxidation-reduction potential of 1050 mV of a 0.03% permanganic acid solution heated at 95° C. Experimental results showed that it is preferable to use an ozone solution of 6, more preferably, an ozone solution having a pH value not greater than 5.

[(A-2) Agent for Adjusting pH Value of Ozone Solution]

Results of tests for examining pH adjusting agents for adjusting the pH value of the ozone solution will be described.

Nitric acid and sulfuric acid, which are representative inorganic acids, and oxalic acid, which is an organic acid, were examined.

Nitric acid added to 500 $cm^3$ pure water to prepare a nitric acid solution of pH 3, and sulfuric acid added to 500 $cm^3$ pure water to prepare a sulfuric acid solution of pH 3. Ozone gas was supplied into the nitric acid solution and the sulfuric acid solution under the ozone supply condition 1. The respective ozone concentrations of the nitric acid solution and the sulfuric acid solution were measured. The respective ozone concentrations of the nitric acid solution and the sulfuric acid solution were twice the ozone concentration of an ozone solution prepared by supplying ozone gas into pure water under the same temperature (60° C.).

Oxalic acid added to 500 $cm^3$ pure water to prepare an oxalic acid solution of pH 2. Ozone gas was supplied into the oxalic acid solution of 50° C. under the ozone supply condition 1. The ozone concentration of the oxalic acid solution was measured. The ozone concentration of the oxalic acid solution in an initial stage of supply was 20 ppm. When the supply of ozone gas was continued, the pH value of the oxalic acid solution rose and the ozone concentration decreased. When ozone gas was supplied continuously into the oxalic acid solution for 2 hr. the pH value of the oxalic acid solution rose up to 3.5 and the ozone concentration of the same decreased to 3 ppm. It is inferred that such changes in pH value and ozone concentration are caused by the consumption of ozone in decomposing oxalic acid, and rising in the pH value of the oxalic acid solution and the reduction in the amount of ozone dissolved in the oxalic acid solution with the oxalic acid concentration of the oxalic acid solution decreases.

Figure 4:
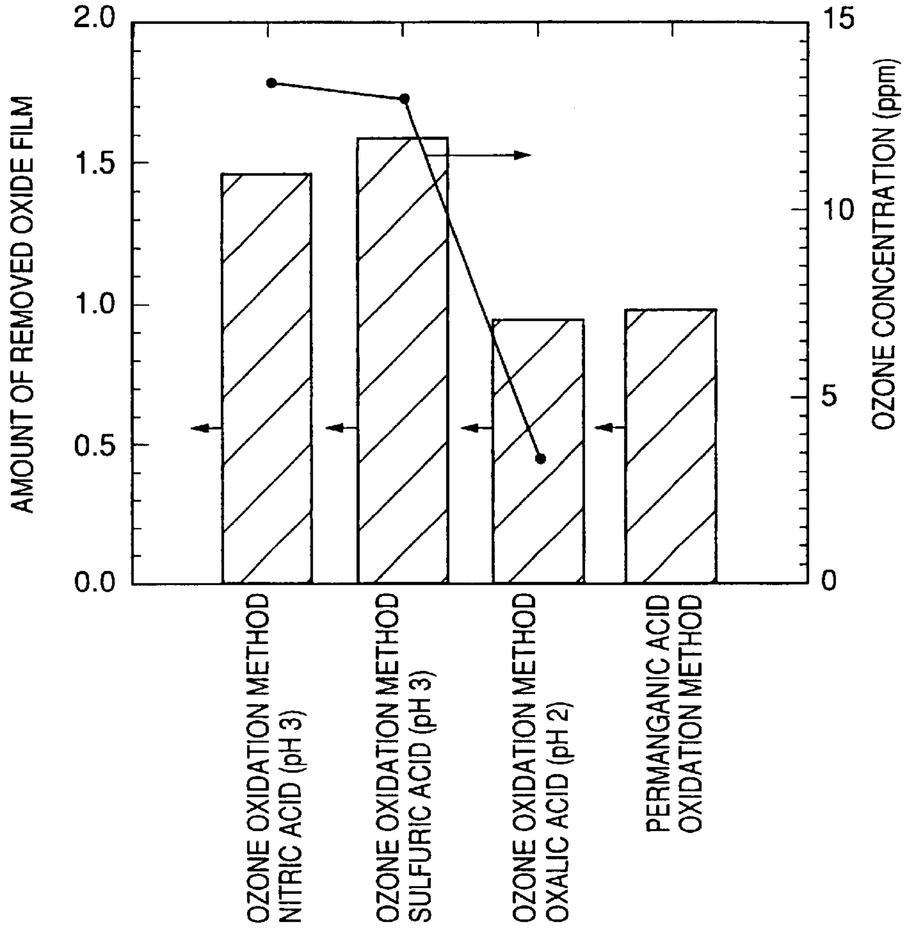
FIG. 4 is a graph of assistance in explaining ozone concentrations of ozone solutions containing different pH adjusting agents, and the oxidative dissolving abilities of those ozone solutions.

Oxide film dissolving experiments were conducted using the ozone solutions prepared by supplying ozone into the nitric acid solution, the sulfuric acid solution and the oxalic acid solution. Test pieces of SUS304 (JIS) with an oxide film formed under the oxidizing condition 1 were immersed in the nitric acid solution of pH 3 prepared by mixing 60° C. pure water and nitric acid, the sulfuric acid solution of pH 3 prepared by mixing 60° C. pure water and sulfuric acid, and the oxalic acid solution of pH 2 prepared by mixing 50° C. pure water and oxalic acid for 2 hr while ozone gas was supplied into those acid solutions under the ozone supply condition 1. Subsequently, the test pieces were immersed in 0.2% oxalic acid solution of 95° C. for 1 hr under the reducing condition 1. After thus removing all the oxides dissolvable by oxidation and reduction, weight loss of the test pieces were measured. Measured results are shown in FIG. 4. In FIG. 4, values (ozone concentrations) for the line are measured on the right vertical line, and values (the amount of removed oxide film) for the rectangles are measured on the left vertical line.

As obvious from FIG. 4, the amounts of the oxide film dissolved in the ozone solutions obtained by dissolving ozone gas in the nitric acid solution and the sulfuric acid solution were about 1.5 times the amount of the oxide film dissolved in the permanganic acid solution. The oxide film dissolving ability of the ozone solution obtained by dissolving ozone in the oxalic acid solution was substantially equal to that of the permanganic acid solution. It was found that the ozone solution containing an inorganic acid, such as nitric acid or sulfuric acid, is excellent in ability to dissolve oxide films by oxidative dissolution.

However, the use of sulfuric acid and hydrochloric acid for decontaminating pipes of nuclear power station is not preferable because sulfuric acid and hydrochloric acid cause stress corrosion cracking and pitting corrosion in metal members. Nitric acid is a proper additive to the ozone solution because nitric acid is oxidative and its corrosion effect on metals is not significant. However, the ozone solution containing nitric acid corrodes metals if the pH value of the ozone solution is excessively small. It is desirable that the ozone solution as applied to oxidation has a pH value of 3 or above.

When an ozone solution containing nitric acid is used for the oxidative dissolving process (A), $NO_3^-$ ions are recovered together with metal ions by an ion-exchange resin in the first solute removing process (C) and become a source of secondary wastes. When a permanganic acid solution is used for an oxidative dissolving process, $Mn^{2+}$ ions are captured by a cation exchange resin.

The amounts of exchanged resins when a 0.03% permanganic acid solution, an ozone solution prepared by dissolving ozone in a nitric acid solution of pH 3 and an ozone solution prepared by dissolving ozone in a nitric acid solution of pH 4 were used as oxidizing agents were estimated for comparison on the basis of the exchange capacities of ion-exchange resins generally used in nuclear power plants (cation exchange resin: 1.9 eq/L, anion exchange resin: 1.1 eq/L). In this comparative tests, $Mn^{2+}$ ions of the permanganic acid solution was recovered with a cation exchange resin, and $NO^{3-}$ ions of the ozone solutions were recovered with a anion exchange resin.

Figure 5:
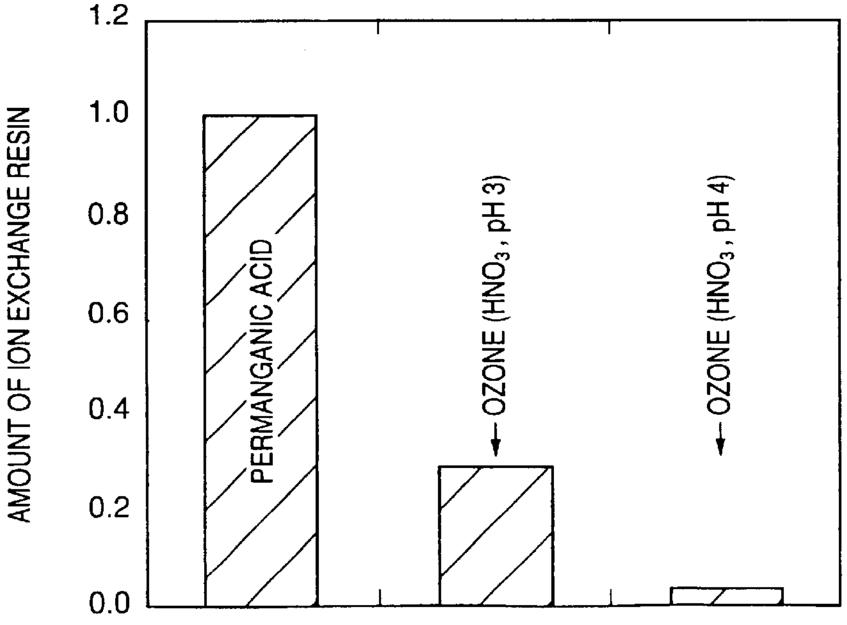
FIG. 5 is a graph showing the effect of different oxidizing agents on the amount of secondary wastes.

The results of the comparative tests are shown in FIG. 5. As obvious from FIG. 5, the amounts of the exchanged resin when the ozone solutions of pH 3 and pH 4 are used are ⅓ and 1/30, respectively, of the amount of the exchanged resin when the permanganic acid solution is used. Thus, even if the ozone solution containing nitric acid is used as an oxidizing agent, the amount of secondary wastes is smaller than that of secondary wastes when the permanganic acid solution is used as an oxidizing agent.

A buffer agent is a possible pH adjusting agent. Generally, buffer agents having buffering ability at a pH value in the range of 3 to 4 are those containing organic acid, such as acetic acid-sodium acetate. When such a buffer is used, ozone is consumed in decomposing organic acid contained in the buffer and the oxidative dissolving ability of the ozone solution will be reduced.

It was found from the results of the tests and examination that it is appropriate to use an inorganic acid as a pH adjusting agent, and nitric acid is a particularly appropriate pH adjusting agent.

[(A-3) Temperature for Oxidative Dissolving Process]

Results of tests conducted to determine the effect of temperature on the oxidative dissolving process will be explained.

In the conventional chemical decontamination method employing a permanganic acid, the decontamination liquid is used at a high temperature of 95° C. for both an oxidizing process and a reducing process. As mentioned above, a 50° C. acidic ozone solution of a pH value in the range of 3 to 5 had a satisfactory oxide film dissolving ability.

Although an ozone solution of a lower temperature has a higher ozone concentration, it is considered that the higher the temperature, the higher is the reaction rate of the oxidizing reaction of chromium oxides. There must be an appropriate temperature condition for dissolving oxide films, properly satisfying both the ozone concentration and the effect in accelerating oxidizing reaction. Studies were made of the temperature dependence of the oxide film dissolving characteristic of the oxidative dissolving process. Ozone solutions of different temperatures in the range of 40° to 95° C. were prepared by supplying ozone into nitric acid solutions of pH value in the range of 3 to 5 under the ozone supply condition 1. Test pieces of SUS304 (JIS) coated with an oxide film prepared under the oxidizing condition 1 were immersed in the ozone solutions. Subsequently, the test pieces were subjected to a reducing process under the reducing condition 1. The amounts of removed oxide films were measured. Measured data is shown in FIG. 6, in which values of the amount of removed oxide film indicated by curves formed by successively connecting blank circles, blank squares and blank rhombuses are measured on the left vertical line, and values of the ozone concentrations of the ozone solutions indicated by curves formed by successively connecting solid circles, solid squares and solid rhombuses are measured on the right vertical line.

Figure 6:
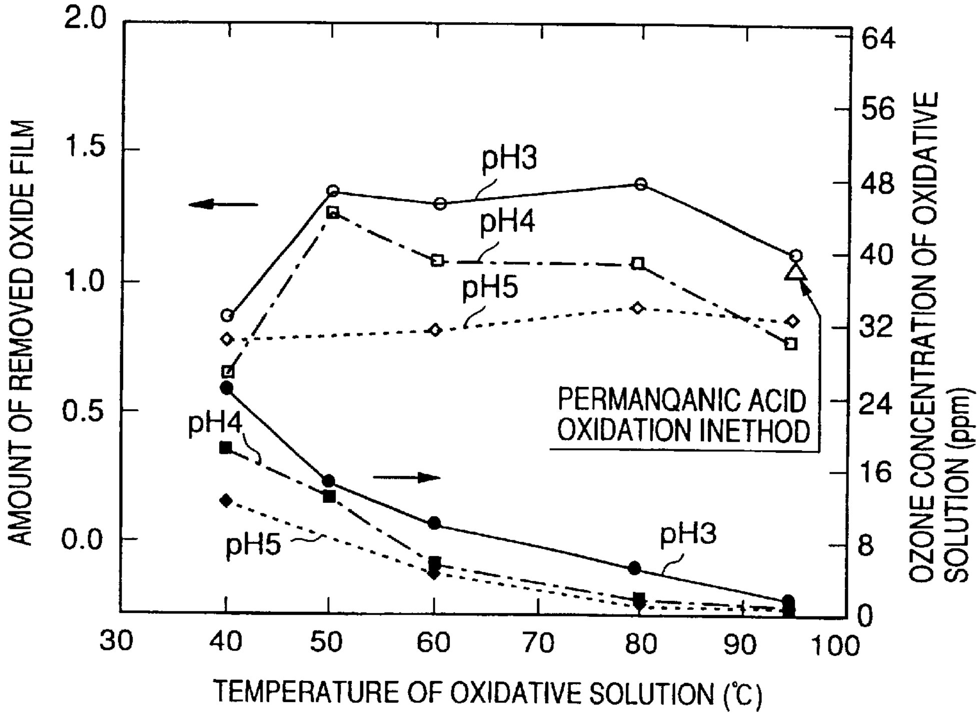
FIG. 6 is a graph showing the dependence of the ozone concentrations of ozone solutions and the amount of an oxide film removed by oxidative dissolution on the temperature of oxidative solution.

As obvious from FIG. 6, the respective ozone concentrations of all the ozone solutions of different pH values were higher when the temperature of the ozone solutions are lower. The amount of the removed oxide film was the smallest when the temperature of the ozone solutions was 40° C. It is inferred that the oxidizing reaction for the oxidation of chromium oxides could not progress when the temperature of the ozone solution was low even if the ozone concentration of the same was high.

It is known from FIG. 6 that the oxide film dissolving ability of the ozone solution is equal to or higher than that of the 95° C. permanganic acid solution when the pH value of the ozone solution is 3 or 4 and the temperature of the ozone solution is in the range of 50° C. to 80° C. It is concluded that the oxidizing process can effectively be achieved when the temperature of the ozone solution is in the range of 50° to 80° C.

[A-4) Maintenance of Ozone Concentration during High Temperature Processing)

Figure 7:
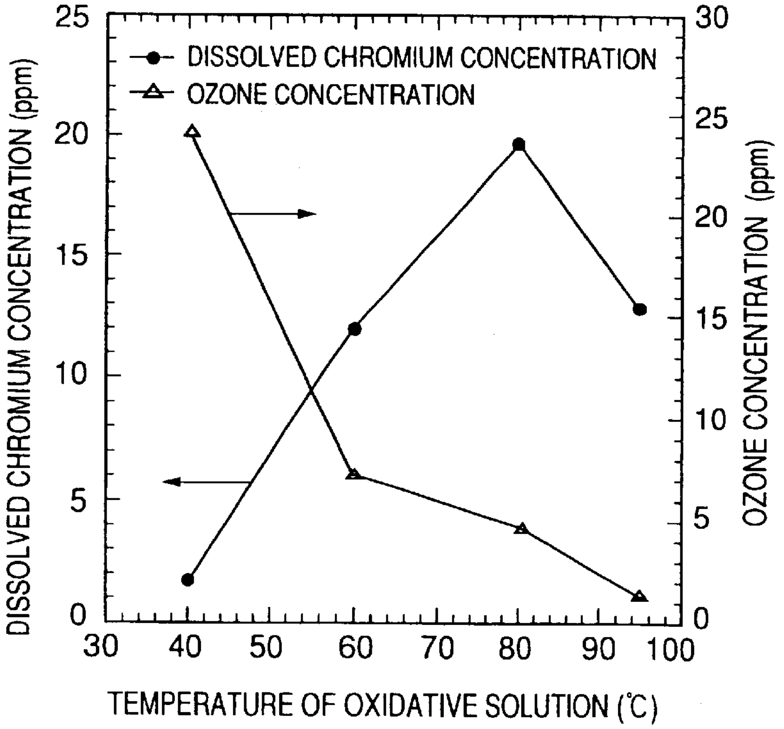
FIG. 7 is a graph showing the dependence of the ozone concentration of an ozone solution and the amount of a dissolved chromium in an ozone solution on the temperature of an oxidative solution.

FIG. 7 shows the temperature dependence of the oxidative dissolving ability of ozone solutions in dissolving chromium oxides. As obvious from FIG. 7, the chromium oxide dissolving effect of the ozone solution reaches a maximum when the temperature of the same is 80° C. However, when the temperature of the ozone solution is as high as 80° C., the decomposition of ozone contained in the ozone solution is promoted and the dissolved ozone decreases in a short time. Consequently, it is possible that the dissolved ozone concentration of the decontaminating liquid decreases and the decontaminating effect of the decontaminating liquid decreases accordingly when the ozone solution is circulated through the contaminated object.

Figure 8:
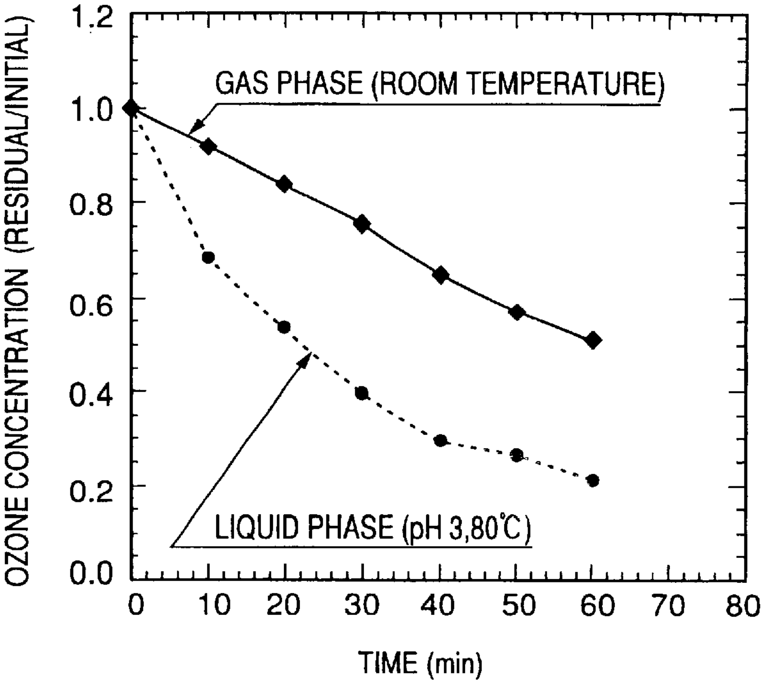
FIG. 8 is a graph showing the variation of ozone concentration in a gas phase and a liquid phase with time.

FIG. 8 is a graph showing the variation of ozone concentration with time when zone is in a gas phase and when ozone is in a liquid phase (i.e., ozone is dissolved in water). It is known from FIG. 8 that the reduction of ozone concentration in a gas phase is slower than that of the same in a liquid phase. Therefore, if ozone gas is injected into the decontaminating liquid by a mixing pump or the like to make bubbles of ozone gas containing an amount of ozone exceeding the amount of ozone dissolvable in the decontaminating liquid circulate together with the decontaminating liquid in the system, ozone contained in the ozone gas dissolves in the decontaminating liquid as the ozone concentration of the decontaminating liquid decreases, so that the reduction of the ozone concentration of the decontaminating liquid can be suppressed.

Figure 9:
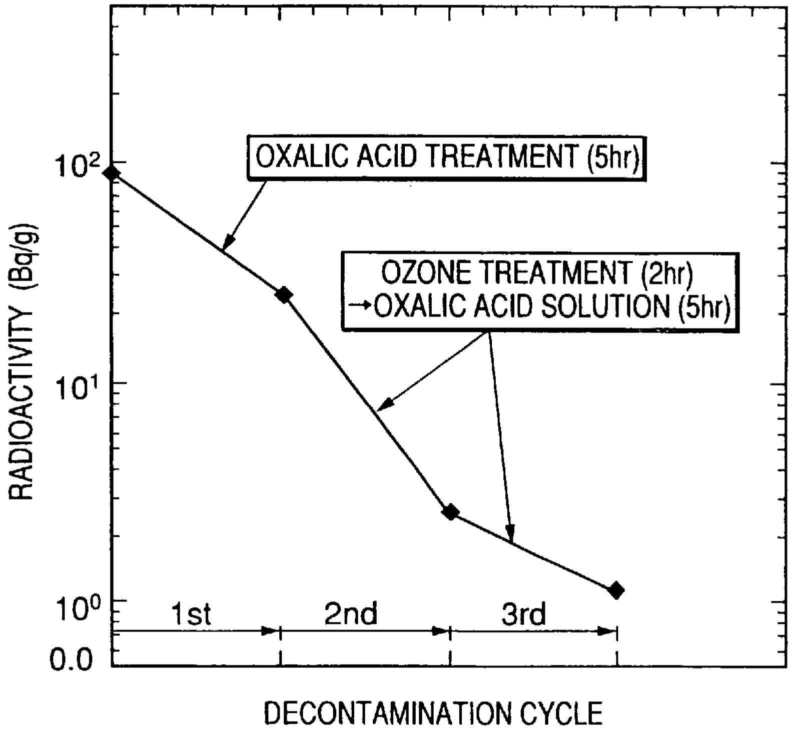
FIG. 9 is a graph of assistance in explaining the decontaminating effect of the chemical decontamination method in accordance with the present invention.

FIG. 9 is a graph showing the result of the decontamination of a metal piece sampled from a pipe of the reactor coolant system of a boiling-water reactor installed in a nuclear power plant by the combined use of an oxidative dissolving process using an ozone solution containing a fixed amount of ozone gas and a reductive dissolving process using an oxalic acid solution. As obvious from FIG. 9, the radioactivity of the test metal piece was reduced to 1/100 or below of the initial radioactivity by three decontamination cycles, i.e., a decontamination cycle 1 using an organic acid solution, a decontamination cycle 2 using an ozone solution and an organic acid solution and decontamination cycle 3 using an ozone solution and an organic acid solution. The result proved that the decontaminating effect of the method according to the present invention is superior to that of the conventional method using a permanganic acid solution. It was known from the test that the use of the ozone solution containing ozone gas as a decontaminating liquid has an enhanced decontaminating effect.

[A-5) Ozonizer]

Figure 10:
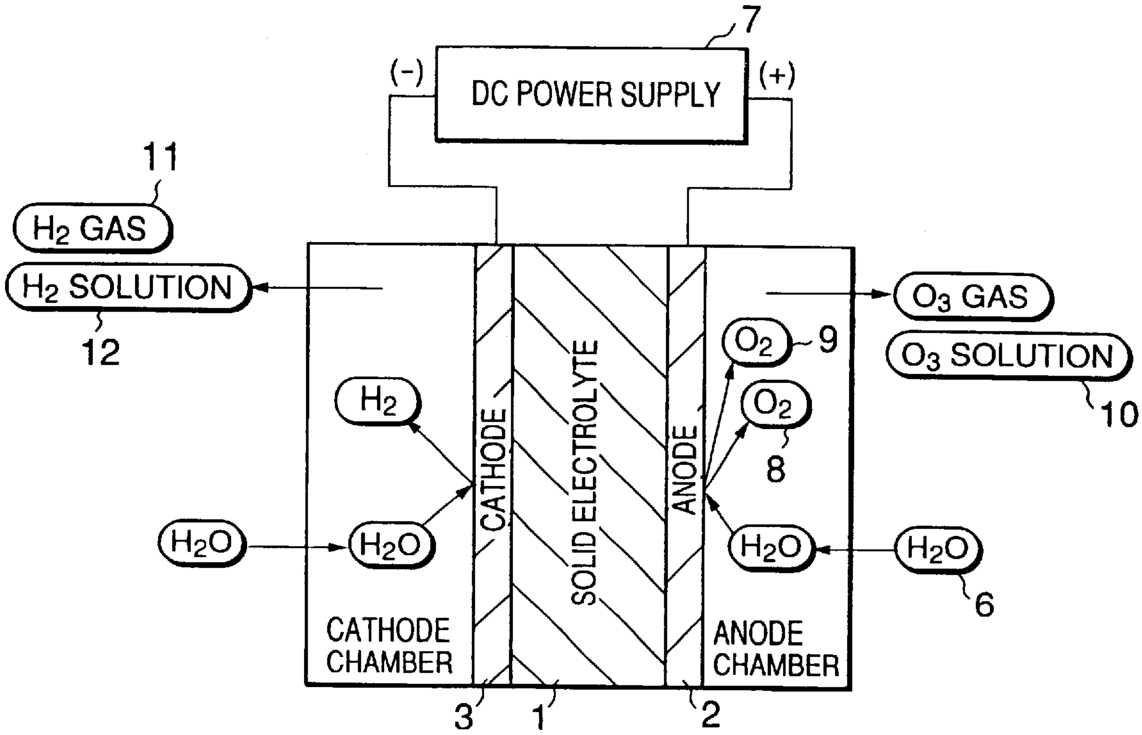
FIG. 10 is a typical view of an ozonizer employed in a solid electrolyte electrolysis process.

An ozonizer suitable for use in the present invention will be described with reference to FIG. 10. Referring to FIG. 10, the ozonizer comprises a solid electrolyte 1 including ion-exchange films, and an electrolyzing system having an anode chamber 4 formed on one side of the solid electrolyte 1 and a cathode chamber 5 formed on the other side of the solid electrolyte 1. An anode 2 of a catalytic metal is disposed in the anode chamber 4, and a cathode 3 is disposed in the cathode chamber 5.

Pure water 6 is supplied into the anode chamber 4 and the cathode chamber 5, and a dc voltage is applied across the anode 2 and the cathode 3 by a dc power supply 7 to electrolyze pure water. Oxygen 8 and ozone gas 9 are generated on the surface of the anode 2 by the following reactions.

$$2H_2O \rightarrow O_2\uparrow + 4H^- + 4e^-$$

$$3H_2O \rightarrow O_3\uparrow + 6H^+ + 6e^-$$

The ozonizer shown in FIG. 10 is capable of generating ozone gas 9 or about 20% by volume ozone concentration at a maximum. This ozone concentration is far higher than that (about 1% by volume) of ozone gas generated by the conventional silent discharge ozonizer. As ozone solution of a high ozone concentration can be produced by supplying the ozone gas 9 generated by the ozonizer shown in FIG. 10 into water or an acid solution. The ozone solution of a high ozone concentration has an enhanced oxide film removing effect.

Ozone dissolves in pure water in the anode chamber 4 to produce an ozone solution 10 in addition to the ozone gas 9 in the anode chamber 4. This ozone solution 10 may be used for oxidizing and dissolving an oxide film formed on a contaminated object.

Hydrogen gas 11 dissolves in pure water in the cathode chamber 5 to produce a reductive solution 12 in addition to hydrogen gas 11 in the cathode chamber 5. The reductive solution 12 may be used in the reductive dissolving process (D) to dissolve iron oxides dissolvable by reduction.

The hydrogen gas 11 generated in the cathode chamber 5 is used in the reductive dissolving process (D) to increase bivalent iron complex which can be captured by cation exchange resin by reducing part of trivalent iron complex contained in the decontaminating liquid by the hydrogen gas 11. When the decontaminating liquid is thus treated, radioactive nuclides contained in the decontaminating liquid can efficiently be separated and captured by the cation exchange resin in the sound solute removing process (E), whereby radioactivity in the environment under decontaminating work can be reduced.

(B) Oxidizing Agent Decomposing Process

After the completion of the oxidative dissolving process, ozone contained in the used ozone solution is decomposed by irradiation with radiation.

The oxidizing agent decomposing process is necessary because there is the possibility that the ion-exchange resin is degraded by ozone if the ozone solution used in the oxidative dissolving process (A) and containing ozone is passed directly through the ion-exchange resin before starting the first solute removing process (C). If the decontaminating liquid contains ozone before the reductive dissolving process (D) is started, an organic acid, such as oxalic acid, added to the decontaminating liquid is decomposed by the ozone, which is economically disadvantageous. The oxidizing agent decomposing process extends the life of the ion-exchange resin and eliminates the necessity of supplying a surplus amount of the reducing agent to compensate the loss of the reducing agent caused by ozone. Since ozone is subject to self-decomposition, the oxidizing agent decomposing process is not necessarily essential.

Figure 11:
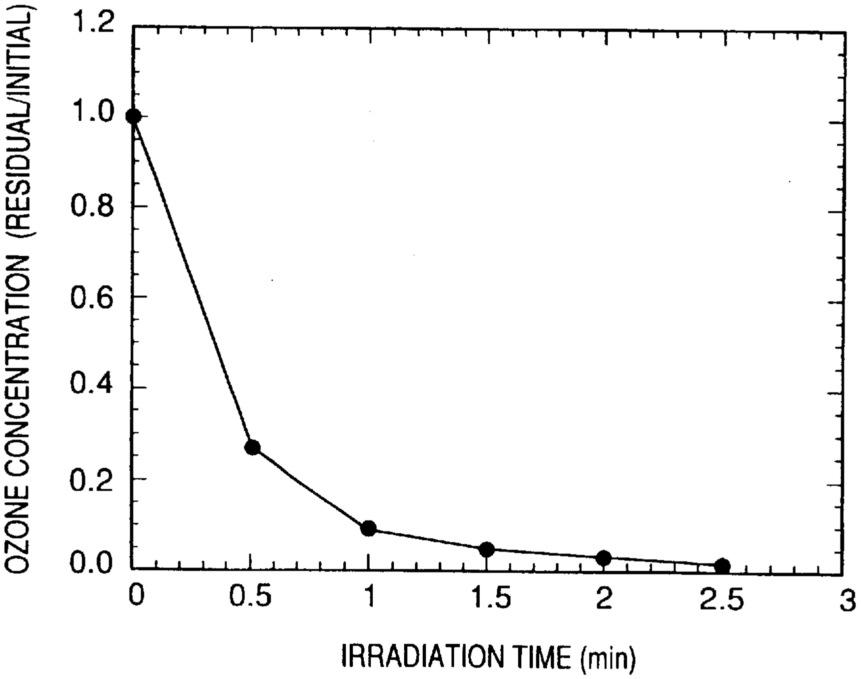
FIG. 11 is a graph showing the ozone decomposing effect of ultraviolet rays.

FIG. 11 is a graph showing the ozone decomposing effect of irradiation of the ozone solution with ultraviolet rays emitted by a low-pressure mercury-vapor lamp. As shown in FIG. 11, the ozone concentration of the ozone solution was reduced to about 1/50 of the initial ozone concentration of the ozone solution when the ozone solution was irradiated with ultraviolet rays for about 2 min; that is, the initial ozone concentration of 3.6 ppm was reduced to 0.1 ppm or less when the ozone solution was irradiated with ultraviolet rays for 2 to 3 min. Thus, the ozone contained in the ozone solution can be decomposed by short-time irradiation with ultraviolet rays.

(C) First Solute Removing Process

The decontaminating liquid, i.e., the solution being in or having been processed by the ozone decomposing process, is passed through the ion-exchange resin in parallel with or after the completion of the oxidizing agent decomposing process (B) to remove ions including metal ions dissolved in the decontaminating liquid in the oxidative dissolving process (A) from the decontaminating liquid. In the first solute removing process (C). chromic acid ions and the acid added as a pH adjusting agent to the ozone solution, are recovered by the anion exchange resin.

When the acid used as a pH adjusting agent, and the chromic acid ions are removed from the decontaminating liquid by the anion exchange resin after decomposing the oxidizing agent, the decontaminating liquid is changed into clean ion-exchanged water. The clean ion-exchanged water may be used, instead of discharging the same as waste water, for preparing a decontaminating liquid for the subsequent reductive dissolving process (D) by mixing a reducing agent, such as oxalic acid, in the clean ion-exchanged water.

(D) Reductive Dissolving Process

A predetermined amount of a reductive organic acid, preferably, oxalic acid, is mixed in the liquid purified in the first solute removing process (C) to prepare a oxalic acid solution, i.e., a decontaminating liquid for the reductive dissolving process. Suitable oxalic acid concentration of the oxalic acid solution is about 0.2% by weight.

The oxalic acid solution heated at 80° C. or higher than 80° C. is supplied to the contaminated object to dissolve iron oxides, which are main components of the oxide film. Iron oxides dissolves in an organic acid, such as oxalic acid by the following reaction.

$$Fe_2O_3+(COOH)_2+4H^-\rightarrow 2Fe^{2-}+3H_3O+2CO_2$$

Thus, the oxidative dissolving process (A) and the reductive dissolving process (D) are used in combination. The oxidative dissolving process (A) removes mainly chromium oxides and the reductive dissolving process (D) removes iron oxides (ferric or ferrous oxide) to remove the oxide film efficiently. Preferably, temperature of the oxalic acid solution is 80° C. or higher, because the iron oxide dissolving ability of the oxalic acid solution starts to increase as the temperature of the oxalic acid solution increases beyond 80° C.

Incidentally, this decontaminating method is intended mainly for decontamination of stainless steel structural members. However, some other structural members of a nuclear reactor are made of carbon steels. Carbon steels are inferior in corrosion resistance and hence there is the possibility that the carbon steel structural members are corroded by the organic acid serving as a decontaminating agent. Accordingly, if contaminated objects to be decontaminated include carbon steel members, it is preferable to use a solution containing oxalic acid and an oxalate. Such a solution maintains a large pH value higher than an oxalic acid solution of the same oxalic acid concentration by a pH buffering action, so that the corrosion of the carbon steel members can be suppressed.

Figure 12:
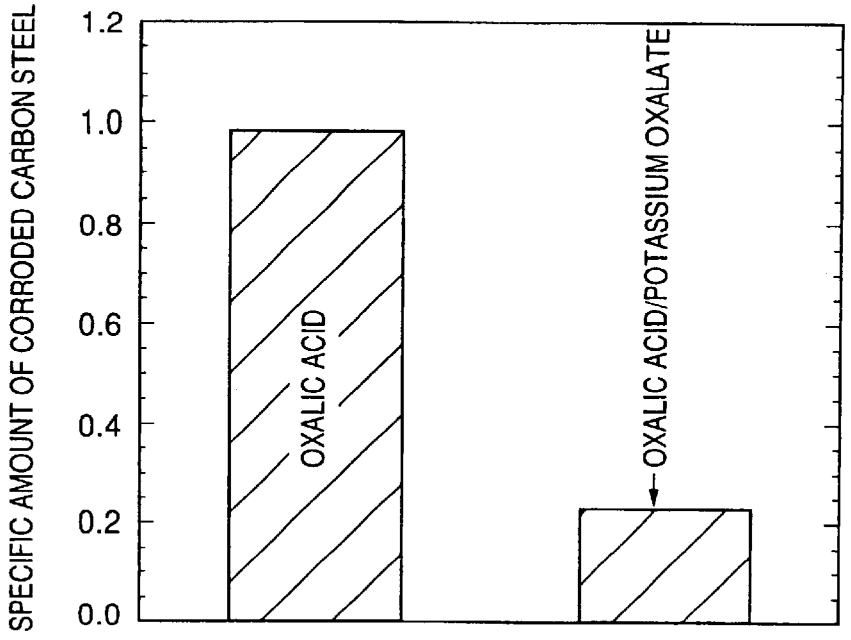
FIG. 12 is a graph of assistance in explaining the difference in carbon steel corroding effect between additives used in a reductive dissolving process.

FIG. 12 shows comparatively the amount of a carbon steel corroded by 0.2% oxalic acid solution as a decontaminating liquid and that of the same corroded by a solution including 0.2% of oxalic acid and 0.3% potassium oxalate. The decontaminating abilities of those decontaminating liquids were substantially the same. The amount of the corroded carbon steel when the oxalic acid/potassium oxalate solution was used was as small as about ⅓ of that of the carbon steel when the oxalic acid solution was used.

(E) Second Solute Removing Process

The decontaminating liquid (oxalic acid solution) used in the reductive dissolving process (D) is passed through a cation exchange resin to remove cations including $Fe^{2-}$ ions and $Co^{2+}$ ions, i.e., reduction nuclides, from the decontaminating liquid.

(F) Reducing Agent Decomposing Process

Ozone is blown into or an ozone solution is added to the oxalic acid solution from which cations have been removed by the second solute removing process (D), and the oxalic acid solution is irradiated with ultraviolet rays to decompose oxalic acid remaining in the oxalic acid solution into $CO_2$ gas and water. When oxalic acid remaining in the oxalic acid solution is decomposed by the agency of ozones and ultraviolet rays, the remainder is only water and hence any secondary wastes are not produced.

The reducing agent decomposing process prevents the consumption of a large part of the exchange capacity of an anion exchange resin by the reducing agent in the subsequent third solute removing process (G).

In the reducing agent decomposing process, hydrogen peroxide may be added to the oxalic acid solution in addition to or instead of ozone, and the oxalic acid solution may be irradiated with radiation in addition to or instead of being irradiated with ultraviolet rays.

Figure 13:
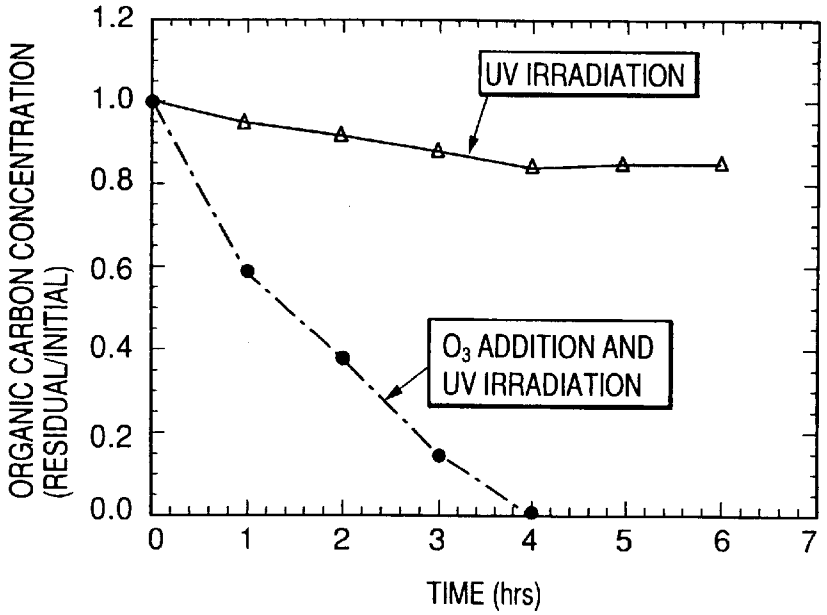
FIG. 13 is a graph showing the oxalic acid decomposing effect of ozone and ultraviolet rays.

FIG. 13 shows the results of experiments conducted to prove the effect of the supply of ozone into the oxalic acid solution and the irradiation of the oxalic acid solution with ultraviolet rays on the decomposition of oxalic acid. In the experiments, 0.7% by volume ozone gas was supplied at a supply rate of 0.8 $dm^3$/min into a 0.2% oxalic acid solution and, at the same time, the oxalic acid solution was irradiated with ultraviolet rays emitted by a high-pressure mercury-vapor lamp of 110 W. The use of both ozone and ultraviolet rays, as compared with the use of only ultraviolet rays, is effective in oxalic acid decomposing and reduced the organic carbon concentration of the oxalic acid solution to 10 ppm or below in 4 hr. When ozone gas of higher ozone concentration is used, decomposing time can further be shortened.

Oxalic acid can be decomposed by using the photocatalysis of titanium oxide that is excited when titanium oxide is irradiated with light. Titanium oxide is an n-type semiconductor in which electrons and positive holes are produced when excited by light having energy greater than the band gap of titanium oxide. The positive holes have high oxidizing power. When water is brought into contact with the positive holes, highly oxidative hydroxy radicals (•OH) are produce by the oxidation of water with the positive holes. When an organic acid solution is brought into contact with titanium oxide excited with light, the organic acid contained in the organic acid solution is oxidized and decomposed by the positive holes of titanium oxide or by hydroxy radicals produced by the effect of the positive holes. The band gap of titanium oxide is about 3.2 eV corresponding to a wavelength of about 380 nm. Therefore, high oxidizing power can be produced by irradiating titanium oxide with light of a wavelength not longer than about 380 nm, such as ultraviolet rays or excimer light.

Figure 14:
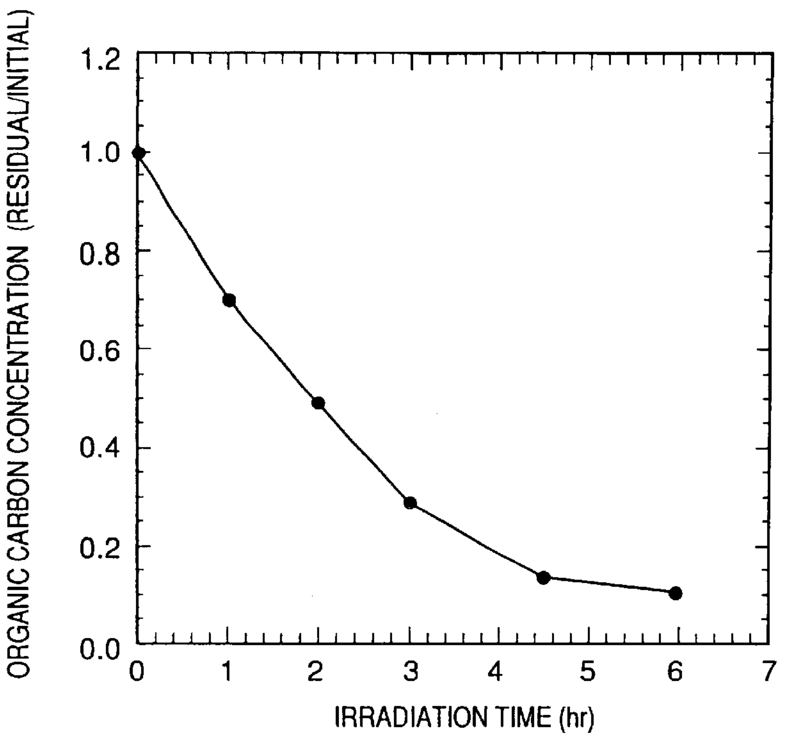
FIG. 14 is a graph showing the organic acid decomposing effect of continued use of titanium oxide and ultraviolet ray.

FIG. 14 shows the results of experiments conducted to prove the effect of titanium oxide irradiated with ultraviolet rays (185 nm and 254 nm) emitted by a low-pressure mercury-vapor lamp on the decomposition of an organic acid. As obvious from FIG. 14, organic carbon concentration decreased to 1⁄10 or below of an initial organic carbon concentration in about 5 hr. Experiments proved that further effective decomposition of the organic acid can be achieved by using ozone in combination with ultraviolet rays.

(G H) Third Solute Removing Process and Waste Liquid Drainage Process

The decontaminating liquid processed by the reducing agent decomposing process (F) contains a small amount of solutes including residual oxalic acid and eluted metals. These solutes can be separated from the decontaminating liquid by passing the decontaminating liquid through a cation exchange resin and an anion exchange resin.

During the processes (A) to (F), the radioactive nuclide concentration of the decontaminating liquid and space dose are measured, and the processes (A) to (F) are repeated when necessary. After the confirmation of the complete removal of the oxide film, the decontaminating liquid is drained as waste water by the drainage process (H). The quality of the waste water is nearly equal to that of ion-exchanged water and can be drained into an existing radioactive liquid waste treatment system of plant itself.

Although the oxidative dissolving process (A) is carried out before the reductive dissolving process (D) in the foregoing method, the sequence of the processes need not be limited thereto. It is also effective to carry out the reductive dissolving process (D), the second solute removing process (E) and the reducing agent decomposing process (F) to remove iron oxides, which a the principal components of the oxide film, before the oxidative dissolving process (A).

It is preferable, in view of exercising satisfactory decontaminating ability, to carry out the processes (A) to (G) at similar temperatures in the range of 50° to 80° C. Since the solution need not be heated or cooled in those processes and the solution can continuously be transferred to the following processes, working time can be shortened and energy consumption can be reduced.

Chemical Decontamination System for Carrying out the Chemical Decontamination Method Chemical decontamination systems for carrying out the foregoing chemical decontamination method will be described hereinafter.

Figure 15:
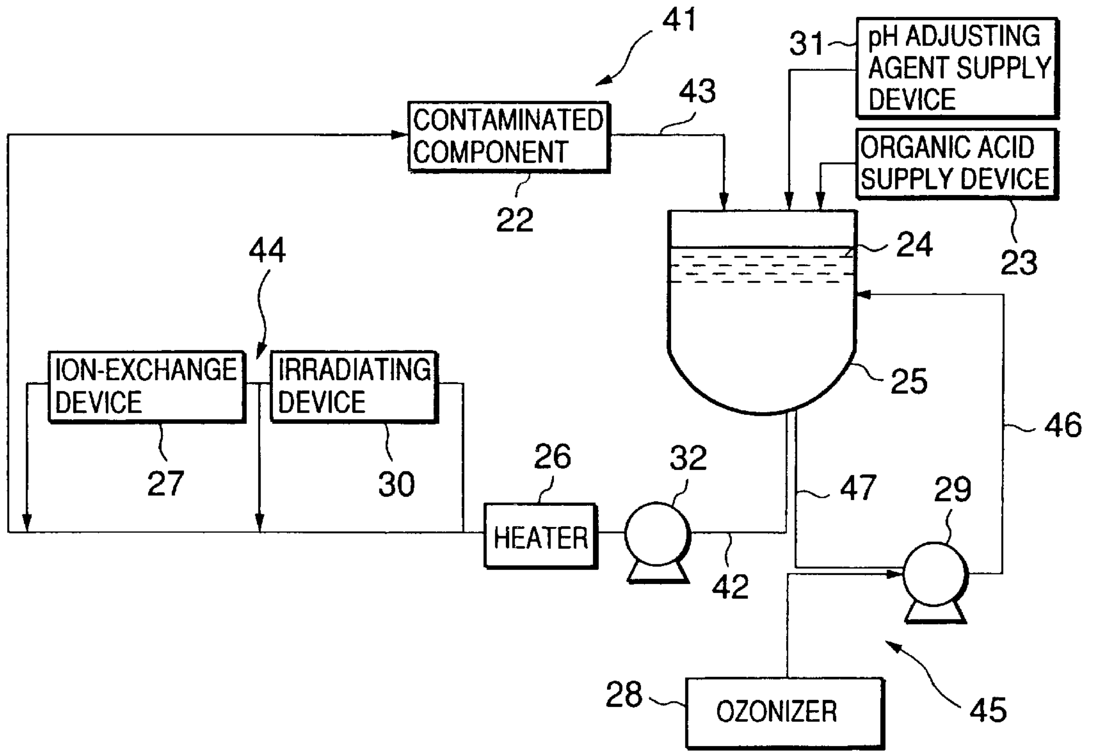
FIG. 15 is a block diagram of a chemical decontamination system in a first embodiment according to the present invention.

Referring to FIG. 15 showing a chemical decontamination system in a first embodiment according to the present invention, a contaminated object 22 is, for example, a pipe of a nuclear reactor or an in-pile device, such as a heat exchanger, through which a decontaminating liquid 24 can flow.

The decontaminating liquid 24 is stored in a buffer tank 25. A decontaminating liquid circulating system 41 is connected to the buffer tank 25 to circulate the decontaminating liquid 24 through the contaminated object 22.

The decontaminating liquid circulating system 41 has a supply line 42 connected to the bottom of the buffer tank 25 to supply the decontaminating liquid 24 to the contaminated object 22, and a return line 43 connected to the upper end of the buffer tank 25 to return the decontaminating liquid passed through the contaminated object 22 to the buffer tank 25.

A circulating pump 32, a heater 26, and a decontaminating liquid purifying system 44 provided with an irradiating device 30 and an ion-exchange device 27 are disposed downstream in that order in the supply line 42.

An ozone injecting system 45 is connected by an ozone injecting line 46 to the buffer tank 25. The ozone injecting system 45 comprises an ozonizer 28 and a mixing pump 29. The inlet of the mixing pump 29 is connected to the bottom of the buffer tank 25 by a connecting pipe 47. A pH adjusting agent supply device 31 and an organic acid supply device 23 are connected to upper parts of the buffer tank 25.

In operation, the organic acid supply device 23 supplies an organic acid, such as oxalic acid, into pure water contained in the buffer tank 25 to prepare an oxalic acid solution of a predetermined oxalic acid concentration, i.e., a decontaminating liquid, the oxalic acid solution is supplied by the circulating pump 32 through the supply line 42 to the contaminated object 22, the oxalic acid solution flowed through the contaminated object 22 is returned through the return line 43 into the buffer tank 25. The heater 26 heats the oxalic acid solution at a predetermined temperature. Iron oxides contained in an oxide film containing radioactive nuclides and adhering to the surface of the contaminated object 22 are reduced by reducing reactions and are dissolved in the oxalic acid solution by reductive dissolution, acidic dissolution and chelation. These operations are performed in the reductive dissolving process (D) (see FIG. 1).

Iron dissolved in the oxalic acid solution and cations, such as cobalt ions, i.e., radionuclides, are separated and recovered from the oxalic acid solution by a cation exchange resin of the ion-exchange device 27. This operation is performed in the second solute removing process (E) (see FIG. 1).

Ozone gas generated by the ozonizer 28 is injected by the mixing pump 29 into the oxalic acid solution, and the oxalic acid solution is irradiate with light (ultraviolet rays) by the irradiating device 30. Consequently, oxalic acid contained in the oxalic acid solution is decomposed into $CO_2$ gas and water. These operations are performed in the reducing agent decomposing process (F) (see FIG. 1). The separation of the dissolved metal ions and the decomposition of oxalic acid may simultaneously be carried out.

After decomposing oxalic acid, the decontaminating liquid is passed through the ion-exchange device 27 of the decontaminating liquid purifying system 44 to remove solutes remaining in the decontaminating liquid. This operation is performed in the third solute removing process (G) (see FIG. 1). At this stage, the decontaminating liquid is clean water nearly the same in quality as ion-exchanged water.

A pH adjusting agent, such as nitric acid, is supplied from the pH adjusting agent supply device 31 into the decontaminating liquid contained in the buffer tank 25 to adjust the pH value of the decontaminating liquid to 5 or below. Ozone gas generated by the ozonizer 28 is injected through the ozone injecting line 46 into the buffer tank 25 by the mixing group 29 to produce an acidic ozone solution. Then, the decontaminating liquid, i.e., the acidic ozone solution, is circulated through the supply line 42 and the return line 43 by the circulating pump 32 to make the decontaminating liquid, i.e., the ozone solution, flow through the contaminated object. The heater 26 heats the decontaminating liquid at a predetermined temperature. Consequently, chromium oxides contained in the oxide film containing radioactive nuclides and adhering to the inner surface of the contaminated object 22 is oxidized and dissolved in the decontaminating liquid. The operation is performed in the oxidative dissolving process. In the oxidative dissolving process (A) (see FIG. 1), it is preferable that an oxidation-reduction potential measuring instrument is disposed at the inlet or the outlet of the contaminated object to measure the oxidation-reduction potential of the ozone solution for monitoring, and a controller, not shown, controls the amount of ozone to be injected into the decontaminating liquid properly on the basis of the measured oxidation-reduction potential.

The decontaminating liquid is irradiated with ultraviolet rays by the irradiating device 30 while the decontaminating liquid is circulated to decompose ozone contained in the decontaminating liquid. This operation is performed in the oxidizing agent decomposing process (B) (see FIG. 1).

After decomposing ozone contained in the decontaminating liquid, the decontaminating liquid is passed through anion exchange resin of the ion-exchange device 27 to remove solutes including metal ions, such as chromic acid ions, and ions, such as nitric acid ions, from the decontaminating liquid. This operation is performed in the first solute removing process (C) (see FIG. 1).

During the reductive dissolving process, the oxidative dissolving process and the solute removing process, the radioactive concentration of the decontaminating liquid and dose rate are measured, and the reductive dissolving process, the oxidative dissolving process and the solute removing process are repeated when necessary. The used decontaminating liquid is cleaned by properly performing the solute removing process. After the decontaminating liquid has sufficiently been cleaned, the used and purified decontaminating liquid is drained as waste water to an existing radioactive liquid waste treatment system in the nuclear power plant.

Figure 16:
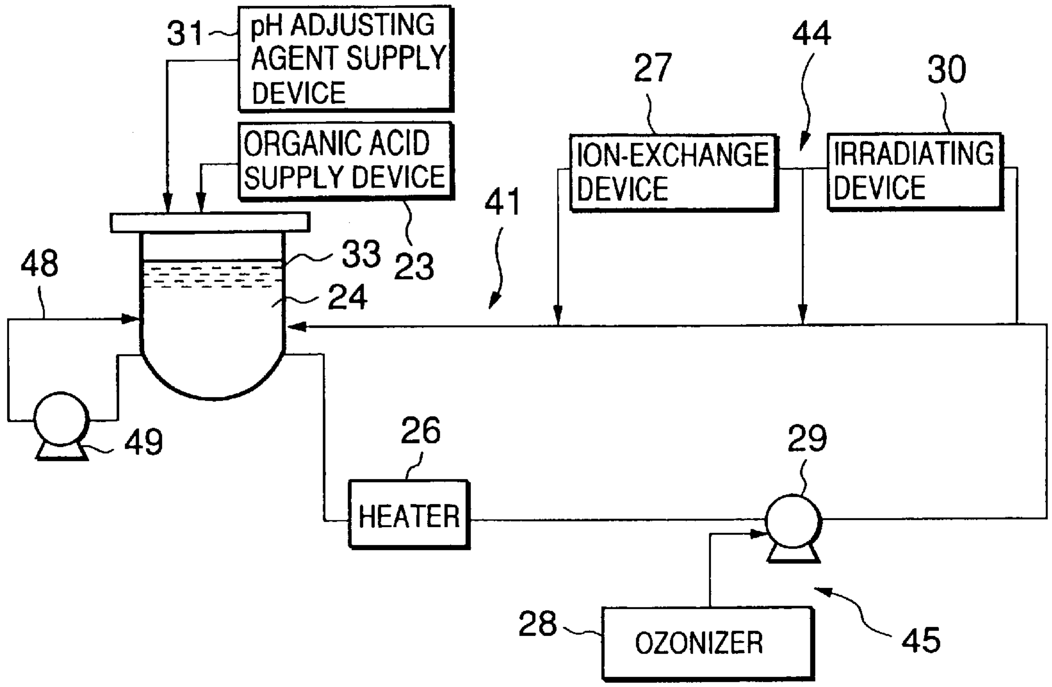
FIG. 16 is a block diagram of a chemical decontamination system in a second embodiment according to the present invention.

A chemical decontamination system in a second embodiment according to the present invention will be described with reference to FIG. 16. This chemical decontamination system is intended for decontaminating a shroud 33 installed in a pressure vessel for a nuclear reactor, a reactor coolant recirculating line 48 connected to the shroud 33, and a recirculating pump 49 disposed in the primary coolant recirculating line 48 as contaminated objects. The second embodiment is characterized in using the shroud 33 having the shape of a vessel as a buffer tank.

A decontaminating liquid circulating system 41 similar to that shown in FIG. 15 is connected to the shroud 33. The decontaminating liquid circulating system 41 may be connected to the shroud 33 by using a fixture, not shown, included in the primary coolant recirculating line 48. The decontaminating liquid circulating system 41, similarly to that shown in FIG. 15, comprises a heater 26, an ozone injecting system 45 and a decontaminating liquid purifying system 44.

A decontaminating liquid 24 filling up the shroud 33 is circulated through the decontaminating liquid circulating system 41 and ozone gas is injected into the decontaminating liquid 24 by a mixing pump 29. The heater 26 heats the decontaminating liquid 24 at a predetermined temperature. A pH adjusting agent supply device 31 and an organic acid supply device 23 are connected to the shroud 33 to be decontaminated to supply a pH adjusting agent and an organic acid into the decontaminating liquid 24 in the shroud 33.

This chemical decontamination system is able to achieve decontamination a procedure similar that carried out by the chemical decontamination system shown in FIG. 15. The recirculating pump 49 and the primary coolant recirculating line 48 can be decontaminated in addition to the shroud 33 by circulating the decontaminating liquid through the primary coolant recirculating line 48 by the recirculating pump 49 during a decontaminating operation.

Figure 17:
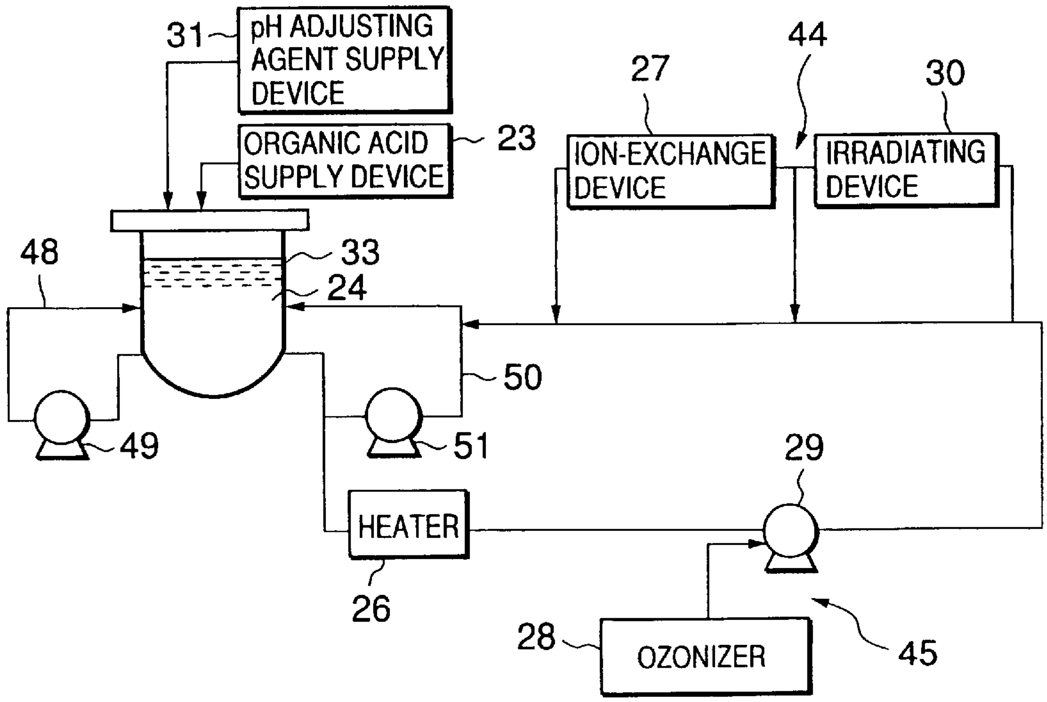
FIG. 17 is a block diagram of a chemical decontamination system in a modification of the second.

It is preferable to connect a bypass line 50 provided with a pump 51 to the outlet side of the ion-exchange device 27 of the decontaminating liquid circulating system 41 and the inlet side of the heater 26 as shown in FIG. 17. The bypass line 50 promotes stirring the decontaminating liquid 24 contained in the shroud 33 to improve the decontaminating effect of the decontaminating liquid 24.

Figure 18:
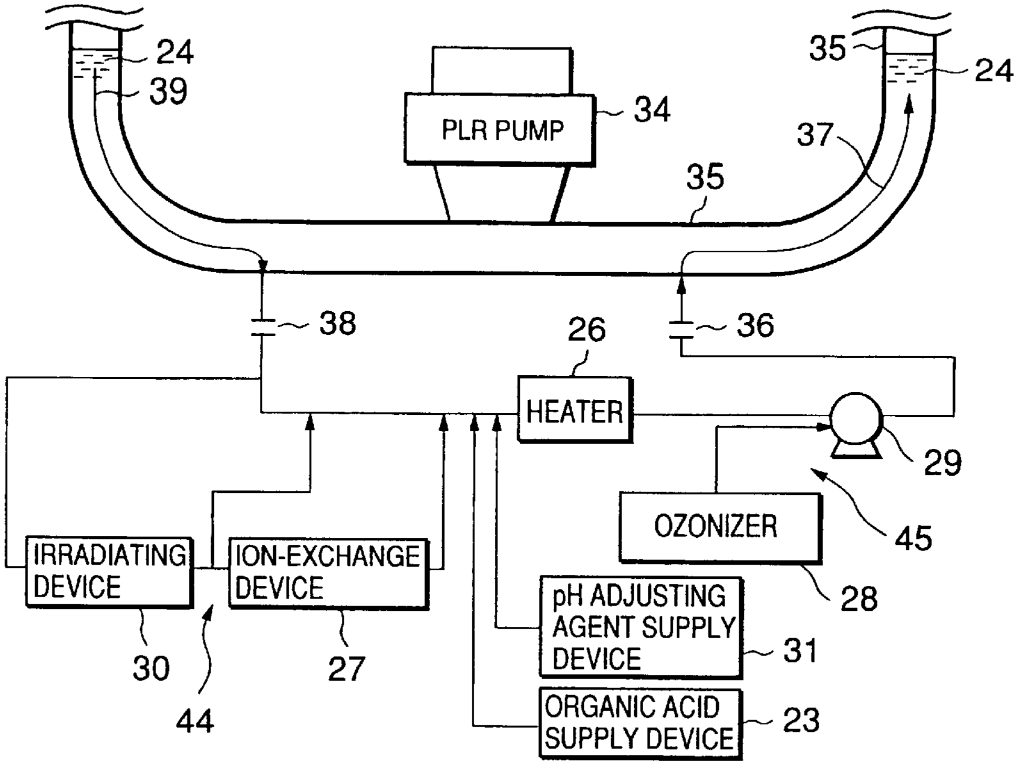
FIG. 18 is a block diagram of a chemical decontamination system in a third embodiment according to the present invention.

A chemical decontamination system in a third embodiment according to the present invention will be described with reference to FIG. 18. This chemical decontamination system is intended for the decontamination of the inner surfaces of a coolant circulating pump 34 and a riser pipe 35 included in a boiling water reactor installed in a nuclear power plant. The riser pipe 35 has a horizontal section and vertical sections rising from the opposite ends, respectively, of the horizontal section. A pump 34 is connected to the horizontal section of the riser pipe 35.

The horizontal section of the riser pipe 35 is provided with a first connecting part 36 and a second connecting part 38 at positions on the opposite sides of the pump 34. The connecting parts 36 and 38 are connected to the opposite ends of a line of a decontaminating liquid purifying system 44, respectively. A decontaminating liquid circulating system 41, similarly to that shown in FIG. 15, comprises a heater 26, an ozone injecting system 45 and the decontaminating liquid purifying system 44. Since the contaminated objects cannot be used as a buffer tank for storing a decontaminating liquid, a pH adjusting agent supply device 31 and an organic acid supply device 23 are connected to a line of the decontaminating liquid circulating system 41.

The first connecting part 36 and the second connecting part 38 are provided with a first tube 37 and a second tube 39 connected to the decontaminating liquid circulating system 41, respectively.

The first tube 37 and the second tube 39 are inserted in the riser pipe 35. A decontaminating liquid is supplied through the first tube 37 into the riser pipe 35 to fill up the riser pipe 35, and the decontaminating liquid is drained through the second tube 39 to circulate the decontaminating liquid through the contaminated objects. The level of the decontaminating liquid in the riser pipe 35 is maintained so that the interior of the coolant circulating pump 34 is filled up with the decontaminating liquid while the decontaminating liquid is circulated. Thus, the coolant circulating pump 34 and the riser pipe 35 can simultaneously be decontaminated. This chemical decontamination system is able to achieve decontamination by a procedure similar to that carried out by the chemical decontamination system shown in FIG. 15.

Figure 19:
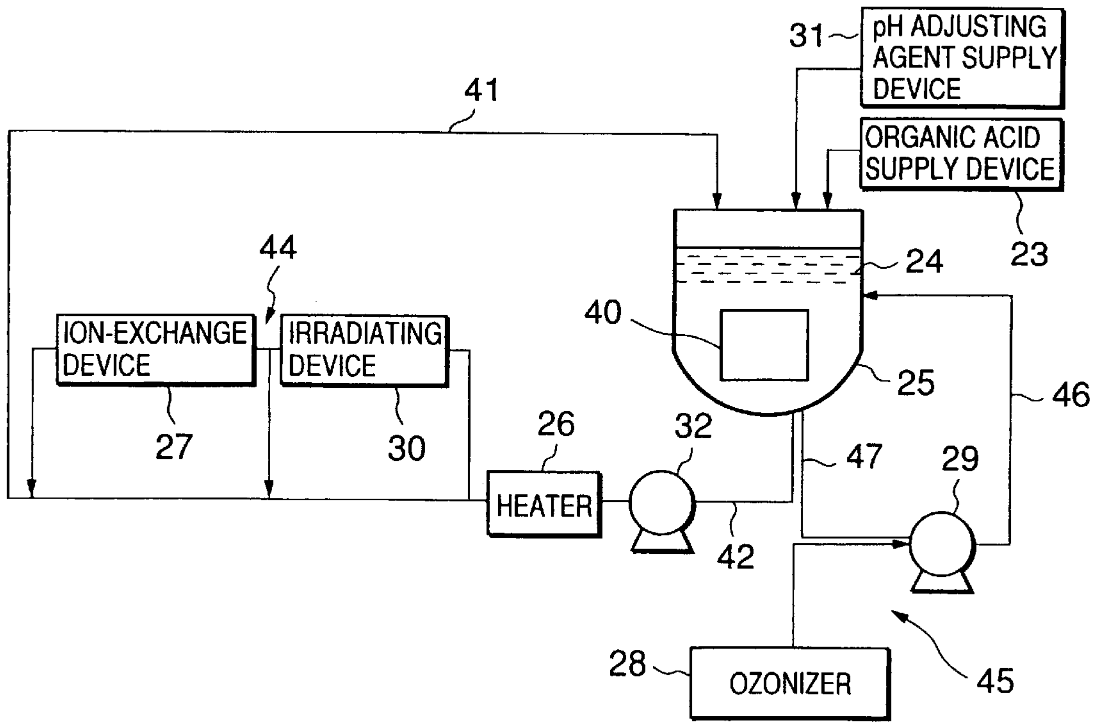
FIG. 19 is a block diagram of a chemical decontamination system in a fourth embodiment according to the present invention.

A chemical decontamination system in a fourth embodiment according to the present invention will be described with reference to FIG. 19. This chemical decontamination system is intended for the decontamination of a contaminated object 40 which is a removable component of nuclear power plant equipment. A buffer tank 25 is sued for both storing a decontaminating liquid and immersing the contaminated object 40 in the decontaminating liquid. The contaminated object 40 is a device or a part through which the decontaminating liquid cannot be passed, such as the rotor of a coolant recirculating pump. This chemical decontamination system is able to achieve decontamination by a procedure similar to that carried out by the chemical decontamination system shown in FIG. 15.

Figure 20:
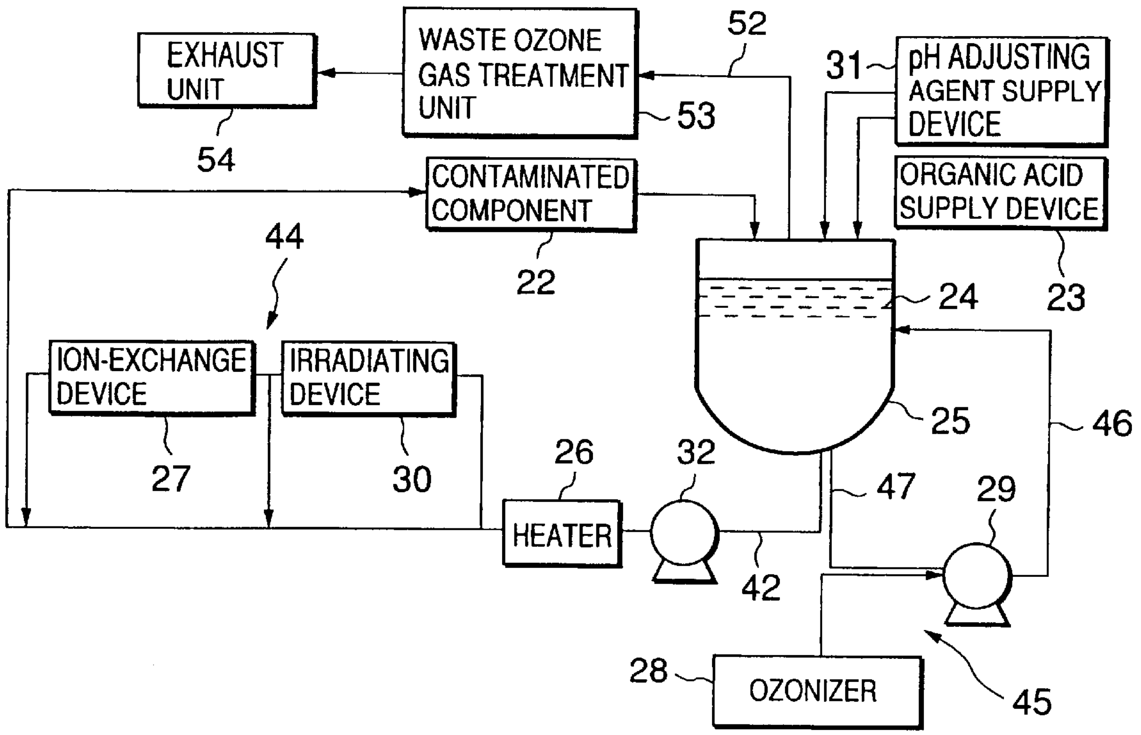
FIG. 20 is a block diagram of a chemical decontamination system in a fifth embodiment according to the present invention.

A chemical decontamination system in a fifth embodiment according to the present invention will be described with reference to FIG. 20. This chemical decontamination system is similar in configuration to that shown in FIG. 15 and differs from the same only in that the chemical decontamination system shown in FIG. 20 is additionally provided with a waste ozone gas treatment unit 53 and a exhaust unit 54.

When venting ozone gas not consumed by the oxidative dissolving process (A) or the reductive agent decomposing process (F) and remaining in the ozone solution after the oxidative dissolving process or the reductive agent decomposing process, the ozone concentration of the ozone gas must not exceed an upper limit ozone concentration specified by regulations (0.1 ppm in Japan). A gas accumulating chamber is formed in the chemical decontamination system and ozone gas accumulated in the gas accumulating chamber is discharged outside after decomposing ozone contained therein by the waste ozone gas treatment unit 53.

Figure 21:
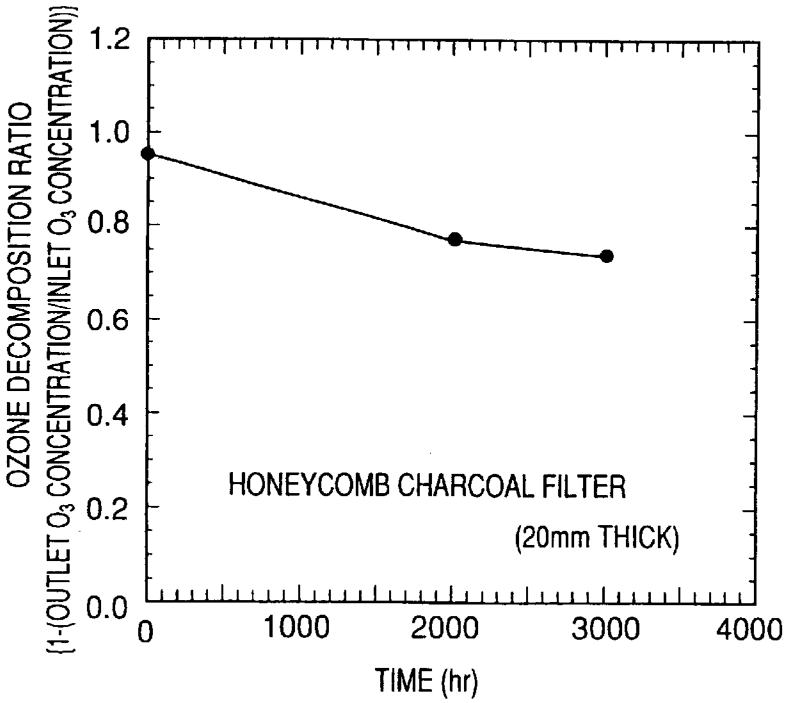
FIG. 21 is a graph showing the ozone decomposing effect of activated charcoal.

It is effective to provide the waste ozone gas treatment unit 53 with a filter comprising activated charcoal or a metal catalyst. An activated charcoal filter is suitable when the ozone concentration of the ozone gas is as low as about several tens parts per million. FIG. 21 shows the variation of the ozone decomposing effect of a honeycomb activated charcoal filter in decomposing ozone contained in ozone gas having a low ozone concentration. As obvious from FIG. 21, the honeycomb activated charcoal filter is capable of decomposing 80% of ozone passed therethrough after the same has been used continuously for 3000 hr.

Figure 22:
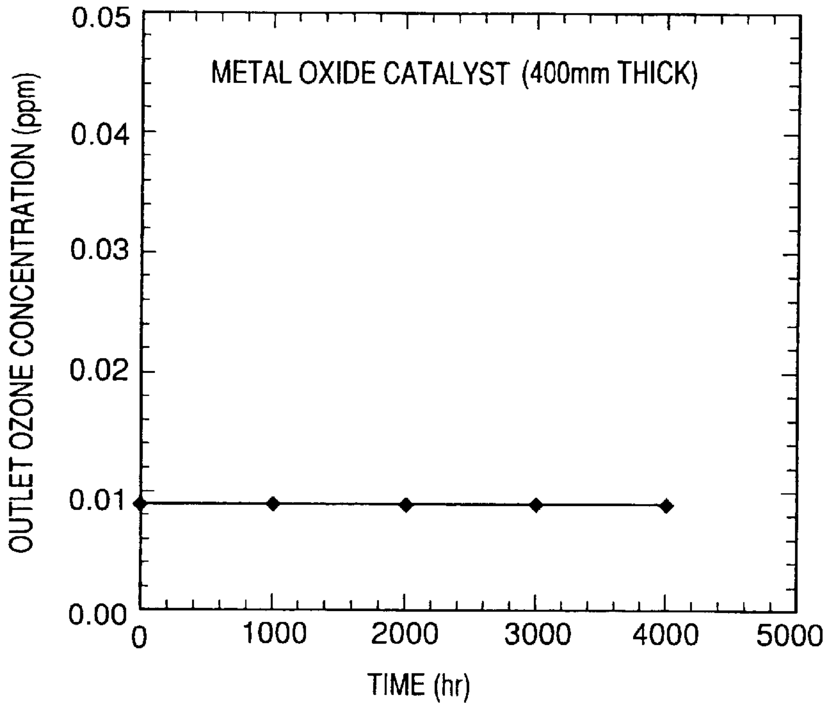
FIG. 22 is a graph showing the ozone decomposing effect of a metal catalyst.

When the ozone concentration of waste ozone gas is as high as 1000 ppm or above, the function of the activated charcoal filter may possibly by reduced by reaction heat generated by the decomposition of ozone. A metal catalyst filter is effective in processing ozone gas having a high ozone concentration. FIG. 22 shows the variation of the ozone decomposing effect of a metal oxide catalyst filter. A catalytic filter comprising a noble metal or a metal oxide, and an inorganic support supporting the noble metal or the metal oxide functions at a high decomposing efficiency. The catalytic filter is capable of reducing the ozone concentration of ozone gas to 0.01 ppm or below after the same has been used for 400 hr or longer.

Figure 23:
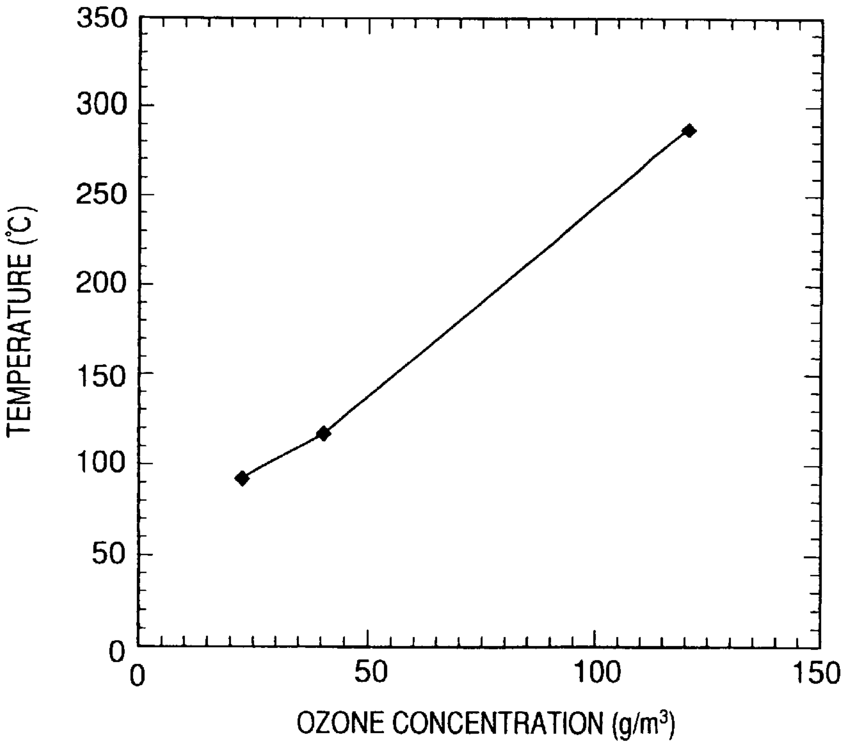
FIG. 23 is a graph showing the amount of heat generated by an ozone decomposing reaction using a metal catalyst.

As shown in FIG. 23, the higher the ozone concentration of ozone gas, the greater is the amount of reaction heat generated when ozone is decomposed. High temperatures enhance the catalytic activity of the metal catalyst filter and ozone decomposing efficiency. Safe ozone gas conforming regulations can be vented from the chemical decontamination system by decomposing ozone contained in waste ozone gas by a waste ozone gas treatment unit of a type selectively determining according to the ozone concentration of the waste ozone gas.

Figure 24:
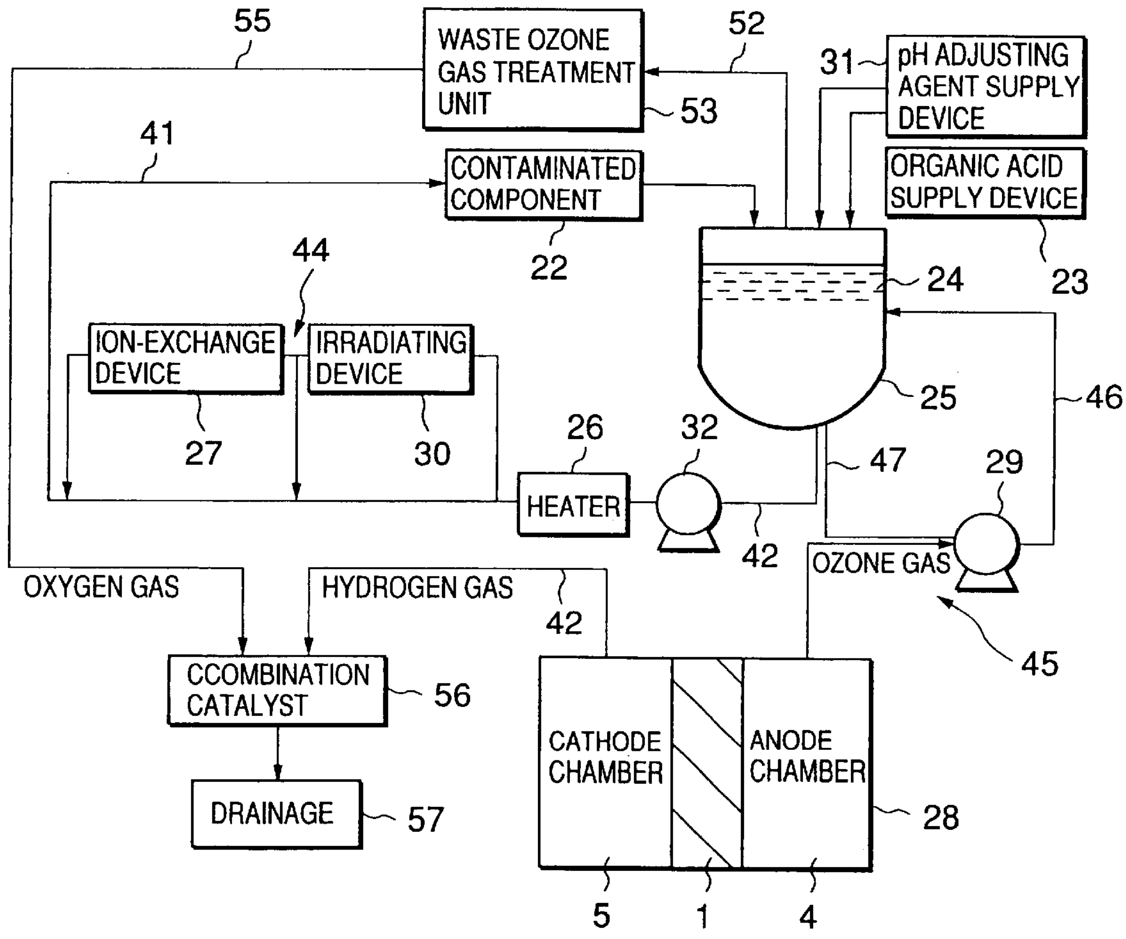
FIG. 24 is a block diagram of a chemical decontamination system in a sixth embodiment showing to the present invention.

A chemical decontamination system in a sixth embodiment according to the present invention will be described with reference to FIG. 24. As shown in FIG. 24, an oxygen gas vent line 55 has one end connected to the outlet side of a waste ozone gas treatment unit 53 and the other end connected to a catalytic combination unit 56. A hydrogen gas supply line has one end connected to a cathode chamber 5 formed in an ozonizer 28 and the other end connected to the catalytic combination unit 56. The chemical decontamination system is not provided with any unit corresponding to the exhaust unit 54. The ozonizer 28 is the same as that shown in FIG. 10. The chemical decontamination system in the sixth embodiment in the same in other respects as that shown in FIG. 20.

The ozonizer 28 of a water electrolysis system generates hydrogen gas in the cathode chamber 5. Ozone contained in waste ozone gas produced in the chemical decontamination system is converted into oxygen gas by a decomposition process. Oxygen gas vented from the waste ozone gas treatment unit 53 and hydrogen gas generated in the cathode chamber 5 of the ozonizer 28 are supplied to the catalytic combination unit 56. Then, the catalytic combination unit 56 bonds the hydrogen gas and the oxygen gas to produce water by a reaction expressed by: $H_2+O_2/2\rightarrow H_2O$.

The catalytic combination unit 56 may employ a catalytic member formed by supporting a catalyst, such as a noble metal, on a support member of alumina or activated charcoal. Water produced by the catalytic combination unit 56 is drained through a drainage unit 57. This chemical decontamination system is able to dispose of ozone and hydrogen gas in safer substances.

Figure 25:
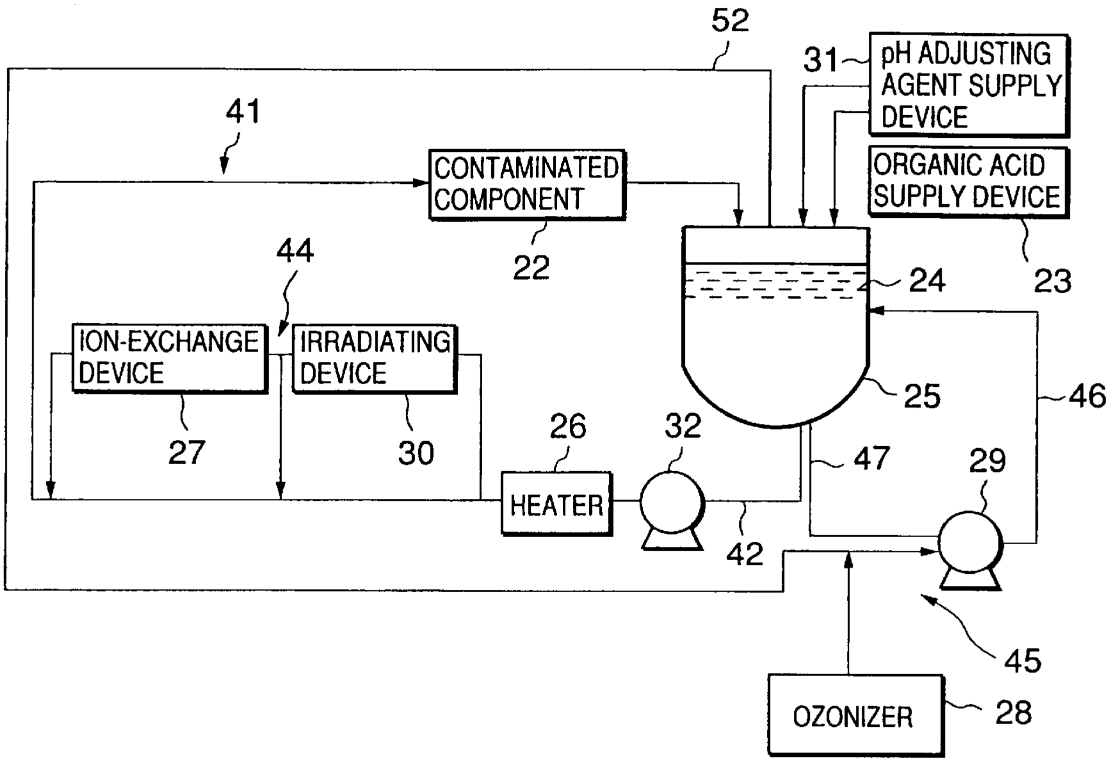
FIG. 25 is a block diagram of a chemical decontamination system in an seventh embodiment according to the present invention.

A chemical decontamination system in a seventh embodiment according to the present invention will be described with reference to FIG. 25. This chemical decontamination system is similar in configuration to that shown in FIG. 15 and differs from the same only in that the chemical decontamination system shown in FIG. 25 is additionally provided with an ozone gas exhaust unit 52 having one end connected to an upper part of a buffer tank 25 and the other end connected to the inlet side of a mixing pump 29 included in an ozone injecting system 45.

When ozone gas generated by the ozonizer 28 is injected into the buffer tank 25 in the oxidative dissolving process or the reductive dissolving process, the unused ozone gas stagnates in the buffer tank 25 and a decontaminating liquid circulating system 41.

The buffer tank has a gas accumulating chamber, not shown, therein. Unused ozone gas accumulated in the gas accumulating chamber is vented through an ozone gas exhaust unit 52 into the inlet side of the mixing pump 29 to return the unused ozone gas into the buffer tank 25. Thus, as exhaust gas containing ozone can effectively used.

Although the invention has been described as applied to the decontamination of components of radioactive material handling facilities, it goes without saying that the present invention is applicable to the decontamination of component members of facilities where radiation and radioactive materials are handled, such as medical facilities and nondestructive inspection facilities.

What is claimed is:

1. A method of removing an oxide film containing radioactive nuclides and adhering to a contaminated object to be decontaminated as a component of a radioactive handling facility, said method comprising the steps of:

providing an acid solution having a pH value in a range of 3 to 6 and consisting of water and an inorganic acid dissolved in the water, the inorganic acid being selected from the group consisting of nitric acid and sulphuric acid, the pH value being adjusted with the inorganic acid;

bringing ozone gas into contact with the acid solution, thereby dissolving the ozone gas into the acid solution to make an ozone solution consisting of ozone dissolved in the acid solution; and contacting the ozone solution with the contaminated object at temperatures in a range of 50 to 90° C., thereby oxidatively dissolving the oxide film with the ozone solution.

2. The method according to claim 1, wherein the inorganic acid is nitric acid.

3. The method according to claim 1, wherein the inorganic acid acts only as a pH adjusting agent, and oxidative dissolution of the oxide film is exclusively effected by the ozone solution.

4. The method according to claim 1, further comprising a step of producing the ozone gas by means of an electrolytic ozonizer, wherein the electrolytic ozonizer has an anode chamber, a cathode chamber, catalytic metal arranged in the anode chamber, and a solid electrolyte disposed between the anode and cathode chambers, and wherein the electrolytic ozonizer is configured so that the catalytic metal is the anode and so that the anode generates the ozone gas in the anode chamber.

5. The method according to claim 1, further comprising a step of monitoring an oxidative dissolving ability of the ozone solution by measuring oxidation-reduction potential of the ozone solution.

6. The method according to claim 1, further comprising a reductive dissolving process which supplies an organic acid solution as a decontaminating solution to the contaminated object to remove the oxide film through the reductive dissolution of the oxide film.

7. The method according to claim 6, comprising:

a reducing agent decomposing process for decomposing an organic acid remaining in the organic acid solution after the reductive dissolving process; and a solute removing process for removing ions remaining in the ozone solution or in the organic acid solution.

8. The method according to claim 7, wherein the reducing agent decomposing process includes the steps of:

adding at least one of either ozone or hydrogen peroxide to the organic acid solution; and irradiating the organic acid solution with at least one of ultraviolet rays or radioactive rays.

9. The method according to claim 7, wherein the reducing agent decomposing process irradiates titanium oxide with light and brings titanium oxide into contact with the organic acid solution to use photocatalytic action of titanium oxide for decomposing the organic acid.

10. The method according to claim 7, further comprising an oxidizing agent decomposing process for decomposing ozone contained in the ozone solution by irradiating the ozone solution with ultraviolet rays or radiation.

11. The method according to claim 6, wherein the organic acid solution used in the reductive dissolving process contains a salt of the organic acid contained in the organic acid solution in addition to the organic acid.

12. The method according to claim 1, further comprising:

adding an organic acid to the ozone solution to form an organic acid solution after contacting the ozone solution with the contaminated object;

contacting the organic acid solution with the contaminated object thereby reducing remaining oxides on the contaminated object;

decomposing the organic acid remaining in the organic acid solution; and removing ions remaining in the organic acid solution after decomposition of the organic acid.

13. A method of removing an oxide film containing radioactive nuclides comprising:

forming an aqueous ozone solution and adjusting the pH of the aqueous ozone solution with an inorganic acid to form an acidic ozone solution;

heating the acidic ozone solution to a temperature of 50–90° C.;

applying the acidic ozone solution to the oxide film wherein ozone in the acidic ozone solution dissolves the oxide film;

decomposing the ozone in the acidic ozone solution by irradiating the ozone with radiation to form an ozone depleted solution; and passing the ozone depleted solution through an ion exchange resin after being irradiated.

14. A method of removing an oxide film containing radioactive nuclides from an object comprising:

dissolving ozone in water to form an aqueous ozone solution;

adjusting the pH of the aqueous ozone solution to a pH range of 3–6 with an inorganic acid to form an acidic ozone solution;

heating the acidic ozone solution to a temperature of 50–90° C.;

applying the acidic ozone solution to the oxide film; and dissolving the oxide film with the ozone in the acidic ozone solution.

15. A method as set forth in claim 14, further comprising:

irradiating and decomposing ozone remaining in the acidic ozone solution after the dissolution of the oxide film to form an ozone free depleted solution.

16. A method as set forth in claim 15, further comprising passing the ozone depleted solution through an ion exchange resin.

17. A method as set forth in claim 15, further comprising adding an organic acid to the ozone free depleted solution to form an organic acid solution and exposing the object to the organic acid solution to dissolve a further oxide on the object.

18. A method as set forth in claim 17, further comprising adding ozone to the organic acid solution after the object has been exposed to the organic acid solution and decomposing the organic acid.

* * * * *